(12) United States Patent
Buttgenbach

(10) Patent No.: US 11,962,159 B1
(45) Date of Patent: Apr. 16, 2024

(54) SEASONAL ELECTRICAL RESOURCE ALLOCATION

(71) Applicant: 8me Nova, LLC, El Dorado Hills, CA (US)

(72) Inventor: Thomas Buttgenbach, Santa Monica, CA (US)

(73) Assignee: 8ME NOVA, LLC, El Dorado Hills, CA (US)

(*) Notice: Subject to any disclaimer, the term of this patent is extended or adjusted under 35 U.S.C. 154(b) by 0 days.

(21) Appl. No.: 18/120,549

(22) Filed: Mar. 13, 2023

Related U.S. Application Data

(63) Continuation of application No. 17/960,338, filed on Oct. 5, 2022, now Pat. No. 11,621,566.

(51) Int. Cl.
| | |
|---|---|
| *H02J 3/38* | (2006.01) |
| *G05B 15/02* | (2006.01) |
| *G05B 19/042* | (2006.01) |
| *H02J 3/00* | (2006.01) |
| *H02J 3/32* | (2006.01) |

(52) U.S. Cl.
CPC .............. *H02J 3/381* (2013.01); *G05B 15/02* (2013.01); *G05B 19/042* (2013.01); *H02J 3/003* (2020.01); *H02J 3/32* (2013.01); *G05B 2219/2639* (2013.01); *H02J 2300/22* (2020.01)

(58) Field of Classification Search
CPC .... H02J 3/381; H02J 3/003; H02J 3/32; H02J 2300/22; G05B 19/042; G05B 2219/2639
See application file for complete search history.

(56) References Cited

U.S. PATENT DOCUMENTS

| | | | | |
|---|---|---|---|---|
| 2010/0308765 A1* | 12/2010 | Moore | .............. | H02J 7/0013 320/148 |
| 2012/0235631 A1* | 9/2012 | Nakashima | ......... | H01M 14/005 361/679.01 |
| 2012/0245744 A1* | 9/2012 | Prosser | ................ | H02J 3/32 700/286 |
| 2012/0256487 A1* | 10/2012 | Yamada | ................ | H02J 7/34 307/43 |
| 2013/0141828 A1* | 6/2013 | Yamaguchi | .......... | H02H 7/18 361/86 |
| 2014/0091762 A1* | 4/2014 | Kondo | ................ | H02S 50/10 320/109 |
| 2014/0330611 A1* | 11/2014 | Steven | ................ | G06F 17/10 705/7.24 |

(Continued)

FOREIGN PATENT DOCUMENTS

JP 2022-108532 A 7/2022

*Primary Examiner* — Ziaul Karim
(74) *Attorney, Agent, or Firm* — Foley & Lardner LLP

(57) ABSTRACT

An REPP may include a renewable energy source (RES), a first meter associated with a first load, a second meter associated with a second load, a first ESS electrically coupled to the RES and the first meter, a second ESS electrically coupled to the RES and the first meter through a switch, and a controller configured to set a first charge/discharge for the first ESS and a second charge/discharge for the second ESS such that the REPP delivers power to the first load longer than the RES produces power, in response to a trigger condition, actuate the switch such that the second ESS is electrically coupled to the second meter, and set a fourth charge/discharge for the second ESS such that the second ESS maintains a portion of its charge in reserve for the second load.

16 Claims, 17 Drawing Sheets

(56) References Cited

U.S. PATENT DOCUMENTS

| | | | |
|---|---|---|---|
| 2014/0330695 A1* | 11/2014 | Steven | H02J 3/00 |
| | | | 705/37 |
| 2015/0115710 A1* | 4/2015 | Tuerk | H02J 13/00006 |
| | | | 307/23 |
| 2016/0124400 A1* | 5/2016 | Kanayama | H02M 1/32 |
| | | | 307/116 |
| 2016/0233682 A1 | 8/2016 | Dionisio et al. | |
| 2017/0005515 A1* | 1/2017 | Sanders | H02J 3/322 |
| 2017/0047738 A1* | 2/2017 | Sasaki | H02J 3/466 |
| 2017/0331322 A1* | 11/2017 | Tuerk | H05B 47/22 |
| 2018/0248376 A1* | 8/2018 | Teramoto | H02J 9/06 |
| 2019/0052090 A1 | 2/2019 | Kobayashi et al. | |
| 2019/0214845 A1 | 7/2019 | Hausman et al. | |
| 2019/0303830 A1 | 10/2019 | Wenzel et al. | |
| 2020/0274368 A1* | 8/2020 | Crouse, Jr. | B60L 3/0092 |
| 2021/0083505 A1* | 3/2021 | Beaston | H02J 7/02 |
| 2022/0244076 A1* | 8/2022 | Karlgaard | H02J 3/003 |
| 2022/0302710 A1* | 9/2022 | Hartley | H02J 3/144 |

\* cited by examiner

SEASONAL ELECTRICAL RESOURCE ALLOCATION

CROSS-REFERENCE TO RELATED APPLICATIONS

This application is a continuation of U.S. patent application Ser. No. 17/960,338 filed Oct. 5, 2022, which application are herein incorporated by reference in their entirety.

BACKGROUND

Energy generated by a renewable energy source (RES) may vary seasonally. In some cases, energy generated by a solar RES can be higher during the summer months when periods of daylight are longer and when peak daytime power is higher; and lower during the winter months when periods of daylight are shorter and when peak daytime power is lower.

Electrical energy demand or electrical power demand from a grid may also exhibit variability. For example, in hot desert regions like the US Southwest, electrical energy demand from the grid can be highest during the summer months, because of air conditioning loads. Conversely, in other regions electrical energy demand from a grid can be highest in winter due to heating loads. Dependent on the geographical location, the climate, industries, and/or culture where the grid is operable, the energy demand or power demand from the grid may exhibit a variety of patterns.

In some cases, variability in energy generation by a RES and variability in energy demanded from a grid may be mismatched.

SUMMARY

Aspects of the present disclosure are directed to a renewable energy power plant (REPP) including a renewable energy source (RES), a first meter associated with a first load, a second meter associated with a second load, a first ESS electrically coupled to the RES and the first meter, and a second ESS electrically coupled to the RES and the first meter through a switch. The REPP may also include a controller, wherein the controller is configured to set a first charge/discharge for the first ESS and a second charge/discharge for the second ESS such that the REPP delivers power to the first load longer than the RES produces power. The controller may also be configured to, in response to a trigger condition, actuate the switch such that the second ESS is electrically coupled to the second meter, set a third charge/discharge for the first ESS such that the REPP delivers power to the first load longer than the RES produces power, and set a fourth charge/discharge for the second ESS such that the second ESS maintains a portion of its charge in reserve for the second load.

Aspects of the present disclosure are directed to an REPP including a renewable energy source (RES), a first meter associated with a first load, a second meter associated with a second load, a first ESS electrically coupled to the RES and the first meter, a second ESS electrically coupled to the RES and a third load through a switch, and a controller configured to set a first charge/discharge for the first ESS such that the REPP delivers power to the first load longer than the RES produces power. The controller may also be configured to, in response to a trigger condition, actuate the switch such that the second ESS is electrically coupled to the second meter and set a third charge/discharge for the second ESS such that the second ESS maintains a portion of its charge in reserve for the second load.

Aspects of the present disclosure are directed to a method including setting, by a controller of an renewable power plant (REPP), a first charge/discharge for a first REPP electrical storage system (ESS) and a second charge/discharge for a second REPP ESS such that the REPP delivers power to a first load longer than an REPP renewable energy source (RES) of the REPP produces power, wherein the first ESS is electrically coupled to the RES and to a first meter, and wherein the second ESS is electrically coupled to the RES and to the first meter through a switch, in response to a trigger condition, actuating the switch such that the second ESS is electrically coupled to the second meter, setting a third charge/discharge for the first ESS such that the REPP delivers power to the first load longer than the RES produces power, and setting a fourth charge/discharge for the second ESS such that the second ESS maintains a portion of its charge in reserve for the second load.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Embodiments of the present disclosure solve the technical problem of allocating specific energy storage resources (ESSs) to specific loads and/or specific uses. Embodiments discussed herein include using a switch to alter a connection between an ESS and a first meter such that the ESS is connected to a second meter instead of the first meter. This allows use of the ESS to be directly tied to the meter, enabling segmentation and cycling of ESS resources. Cycling ESS resources such that different ESSs are used for different purposes at different times allows for ESS use and degradation to be managed and/or levelized across multiple ESSs. Managing and/or levelizing ESS degradation allows for accurate predictions of ESS lifetime and performance. Additionally, the embodiments discussed herein solve the technical problem of ESS underutilization. By altering connections and uses of ESSs, ESS storage capacity may be directed away from uses where it is underutilized and towards uses where it is more fully utilized. For example, an ESS that is connected to a load for time-shifting renewable energy source (RES) output may be underutilized if the RES output falls below a threshold. Actuating a switch to alter a use of the ESS offers the technical advantage of putting unused ESS capacity to use in a distinct, measurable use case. Time-shifting RES output using an ESS is discussed in related U.S. patent application Ser. No. 17/589,596, which is incorporated by reference.

In an illustrative embodiment, any of the operations described herein can be implemented at least in part as computer-readable instructions stored on a computer-readable memory. Upon execution of the computer-readable instructions by a processor, the computer-readable instructions can cause a node, such as a computing node or a power plant node, to perform the operations.

Figure 1:
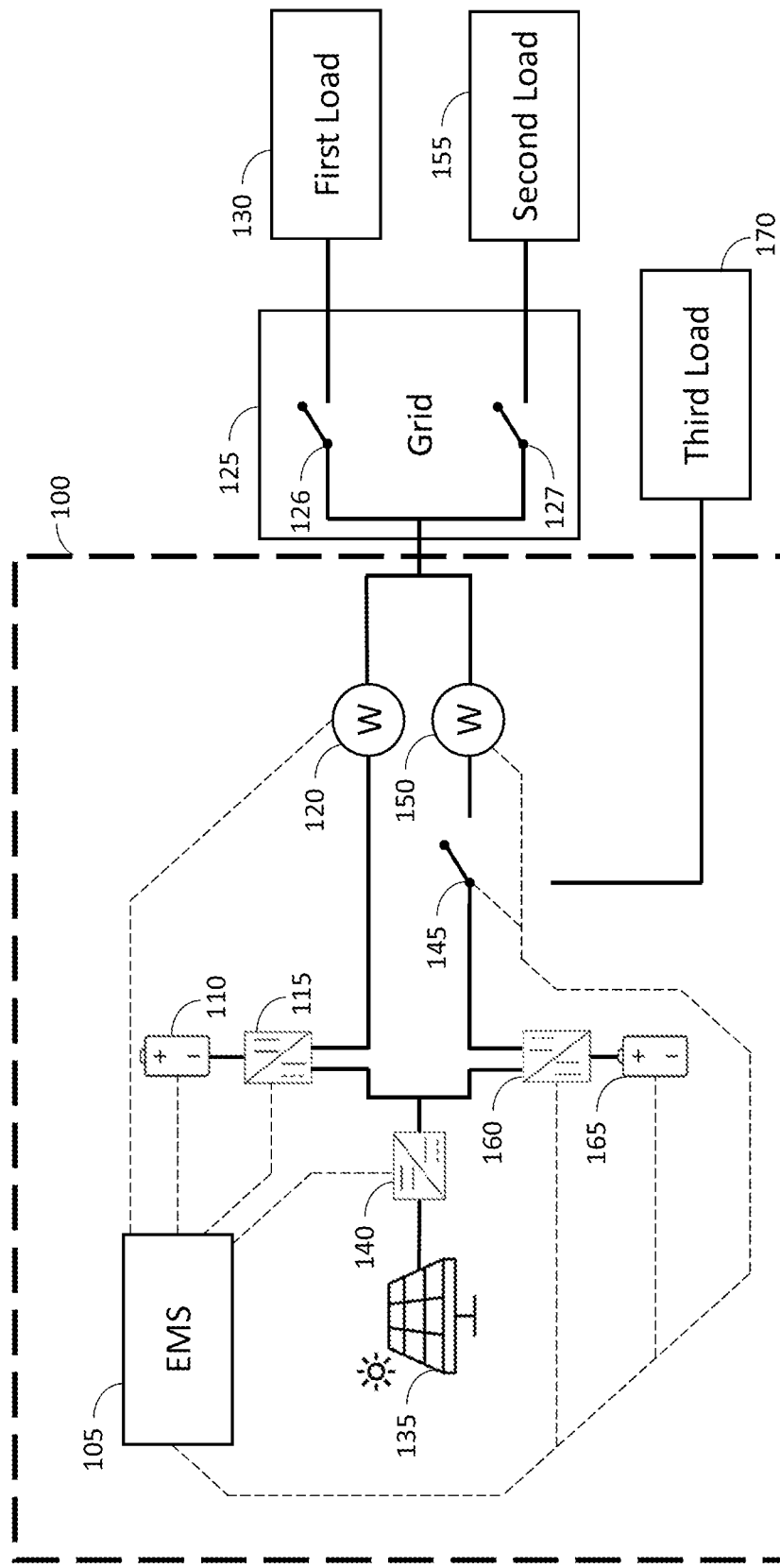
FIG. 1 is a block diagram of an example renewable energy power plant (REPP), according to one or more embodiments.

FIG. 1 is a block diagram of an example renewable energy power plant (REPP) 100, according to one or more embodiments. The REPP 100 may include a renewable energy source (RES) 135, an RES inverter 140, a first energy storage system ESS 110, a first ESS inverter 115, a first meter 120, a second ESS 165, a second ESS inverter 160, a switch 145, a second meter 150, and an energy management system (EMS) 105. The RES 135 may be a solar power source, a wind power source, a geothermal power source, or any other source of renewable energy. The RES may be electrically connected to the RES inverter 140. The RES inverter 140 may convert DC power from the RES to AC power. The RES inverter 140 may be connected to the first meter 120. The first energy storage system (ESS) inverter 115 may be connected to the RES inverter 140 and the first meter 120. The first ESS 110 may be connected to the first ESS inverter 115. The first ESS 110 may be configured to receive power from the RES 135 and provide power to the first meter 120. The first ESS 110 may be charged from the RES 135 and may discharge to provide power to the first meter 120. The first ESS inverter 115 may be a bidirectional inverter. The first ESS inverter 115 may convert AC power from the RES inverter 140 to DC power to charge the first ESS 110 and convert DC power from the first ESS 110 to AC power to provide power to the first meter 120. The REPP 100 may be connected to a first load 130 and a second load 155 through a grid 125. In some embodiments, the grid may be a utility grid. The first meter 120 may be associated with the first load 130. The first meter 120 may measure an amount of power delivered by the REPP 100 to the first load 130 through the grid 125. The RES inverter 140 may be connected to the switch 145. The second ESS inverter 160 may be connected to the RES inverter 140 and the switch 145. The second ESS 165 may be connected to the second ESS inverter. The second ESS 165 may be configured to receive power from the RES 135 and provide power to the switch 145. The second ESS 165 may be charged from the RES 135 and may discharge to provide power to the switch 145. The second ESS inverter 115 may be a bidirectional inverter. The second ESS inverter 115 may convert AC power from the RES inverter 140 to DC power to charge the second ESS 165 and convert DC power from the second ESS 165 to AC power to provide power to the switch 145. The second meter 150 may be associated with the second load 155. The second meter 150 may measure an amount of power delivered by the REPP 100 to the second load 155. The switch 145 may be configured to connect the second ESS inverter 160 to the second meter 150. The switch 145 may be configured to connect the second ESS inverter 160 to a third load 170. The switch 145 may be configured to connect the second ESS inverter 160 to the first meter 120. The EMS 105 may be configured to gather data from the first meter 120, the first ESS 110, the first ESS inverter 115, the RES inverter 140, the second ESS inverter 160, the second ESS 165, the switch 145, and the second meter 150. The EMS 105 may be configured to control the first ESS inverter 115, the RES inverter 140, and the second ESS inverter 160 by adjusting inverter setpoints. The EMS 105 may control the RES inverter 140 to adjust an RES output. The EMS 105 may control the first ESS inverter 115 to control a charge/discharge of the first ESS 110 and to permit energy to flow directly from the RES inverter 140 to the first meter 120. The EMS 105 may control the second ESS inverter 160 to control a charge/discharge of the second ESS 165 and to permit energy to flow directly from the RES inverter 140 to the any load connected through the switch 145. The EMS 105 may be configured to control the switch 145 to selectively connect the second ESS inverter 160 to the first meter 120, the second meter 150, or the third load 170.

The EMS 105 may actuate the switch 145 to selectively connect the second ESS inverter 160 to the first meter 120, the second meter 150, or the third load 170 based on a trigger condition. In some embodiments, the trigger condition may be a termination of a time period. The time period may be a season. For example, the EMS 105 may actuate the switch 145 based on summer ending and fall beginning. In other embodiments, the trigger condition may be the RES output, such as a daily average RES output, falling below a predefined threshold. In some embodiments, the predefined threshold may be based on power demands of the first load 130. For example, the RES output may fall below a threshold such that the RES 135 does not produce enough daily energy to satisfy the power demands of the first load 130 and satisfy power demands of the second load 155 and the third load 170.

The RES 135 may deliver power directly to the first load via the grid 125. The RES 135 may deliver power to the first ESS 110 to charge the first ESS 110. The EMS 105 may determine how much power the RES 135 delivers to the first load 130, how much power the RES 135 delivers to the first ESS 110, and how much power the first ESS 110 delivers to the first load 130. The EMS 105 may determine how much power the RES 135 produces. The first ESS 110 may be charged by the RES 135 and later discharged to provide power to the first load 130. In some embodiments, the first ESS 110 may be simultaneously charged by the RES 135 and discharged to provide power to the first load 130. The first meter 120 measures an amount of energy delivered to the first load 130. The amount of energy delivered to the first load 130 may be a sum of the energy delivered to the first load 130 by the RES 135 and the energy delivered to the first load 130 by the first ESS 110. The first ESS 110 may deliver power to the first load 130 when the RES 135 is not delivering power to the first load 135, or when the RES 135 is delivering power to the first load 135. The EMS 105 may determine a charge/discharge of the first ESS 110 and a state of charge (SOC) of the first ESS 110.

As understood by one skilled in the art, the grid 125 may include various components for delivering power to the first load 130 and the second load 155. The grid 125 may include a first grid switch 126 and a second grid switch 127. The first grid switch 126 may control power delivered to the first load 130 and the second grid switch 127 may control power delivered to the second load 155. In an example, the first grid switch 126 may be actuated to establish a connection with the first load 130 and deliver power to the first load 130. In an example, the second grid switch 127 may be actuated to establish a connection with the second load 155 and deliver power to the second load 155. While the grid 125 is illustrated as including two switches, persons skilled in the art recognize that the grid 125 may include a plurality of switches and/or other components for delivering power to the first load 130 and/or the second load 155.

In some embodiments, the RES 135 and the first ESS 110 are sized such that the REPP 100 can deliver power to the first load 130 with a capacity factor greater than or equal to about 60-80%. In some embodiments, the capacity factor is 80-100%. In some embodiments, the capacity factor varies (e.g., seasonally). The RES 135 may be sized to produce enough energy to satisfy power demands of the first load 130 despite variations in RES output inherent in many RESs. The RES 135 may have a peak output higher than the power demands of the first load 130. The first ESS 110 may be sized to store an amount of energy from the RES 135 sufficient to time-shift the RES output to satisfy the power demands of the first load 130. The EMS 105 may control the RES 135 and/or the first ESS 110 to deliver power to the first load 130. The RES 135 may produce a first amount of energy each day, where the first amount of energy is sufficient to satisfy the power demands of the first load 130. The RES 135 may produce the first amount of energy at a level of reliability (i.e., the RES 135 produces the first amount of energy a particular percentage of days in a year). The level of reliability may be specified for the first load 130. The first ESS 110 may store a portion of the first amount of energy such that the power delivered to the first load 130 from the REPP 100 is spread out throughout each day. The REPP 100 may provide power to the first load 130 for a period of time longer than the RES 135 produces power. In an example, the RES 135 is a solar power source which produces power until 7:00 pm, and the first ESS 110 stores the portion of the first amount of energy and discharges it such that the REPP 100 delivers power to the first load 130 until midnight. In another example, the REPP 135 is a solar power source which produces power until 7:00 pm, and the first ESS 110 stores the portion of the first amount of energy such that the REPP 100 provides power to the first load 130 continuously.

Figure 2:
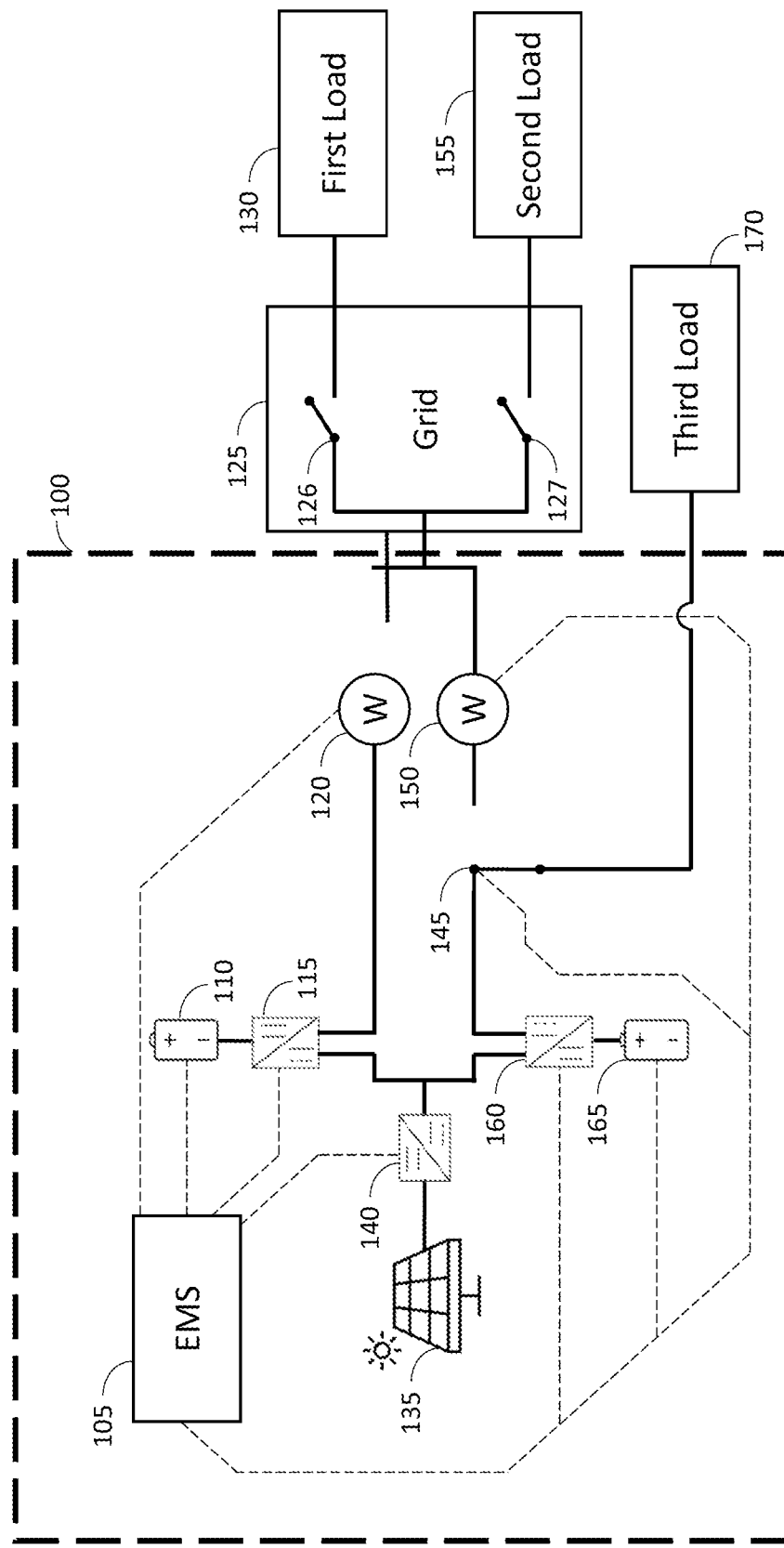
FIG. 2 is a block diagram of the REPP of FIG. 1, with a switch connecting a second energy storage system (ESS) with a third load.

FIG. 2 is a block diagram of the REPP of FIG. 1, with the switch 145 connecting the second energy storage system (ES S) 165 with the third load 170 and not connecting the second ESS 165 with the first meter 120 or the second meter 150. In this configuration, the RES 135 and the second ESS 165 can supply power to the third load 170. In this configuration, the REPP 100 supplies power to the first load 130 via the grid 125 and to the third load 170 directly. For purposes of discussion, this configuration will be referred to herein as "summer mode." However, this configuration is in no way restricted to use in summer.

Summer mode may be used in times when the RES 135 produces an excess amount of energy over the power demands of the first load 130. For example, a solar array may produce more power in the summer than in the winter, resulting in surplus power production in the summer. In some embodiments, the REPP 100 may deliver some or all the excess energy to the grid 125. However, in places where solar energy is prevalent, power delivered at times of day when solar energy sources produce power, such as as-delivered solar power, generally has low value relative to power delivered at times of day when solar energy sources do not produce power. In other embodiments, the REPP 100 may deliver power to the third load 170. The REPP 100 may deliver power to the third load 170 because the ability to use an ESS to time-shift the energy to a higher-value time of day may be operationally and economically preferable to delivering power. The REPP 100 may time-shift the RES output using the second ESS 160 to deliver power to the third load 170 longer than the RES 135 produces power and/or at times when power is in lesser supply than during peak solar production times. The second ESS 160 may have a storage capacity large enough to store the excess energy produced by the RES 135. The second ESS 160 may have a charge/discharge capacity large enough to be charged by excess power produced by the RES 135 and deliver power to the third load 170 when needed.

The EMS 105 may control the charge/discharge of the first ESS 110 and the charge/discharge of the second EMS 160 to time-shift the RES output to satisfy the power demands of the first load 130 and deliver power to the third load 170. In some embodiments, the EMS 105 may control the RES output of the RES 135 to satisfy the power demands of the first load 130 and deliver power to the third load. The EMS 105 may adjust inverter setpoints of the first ES S inverter 115 and the second ES S inverter 160 to control the charge/discharge of the first ESS 110 and the charge/discharge of the second EMS 160.

When the RES output exceeds the power demands of the first load 130, the EMS 105 may direct a first load portion of the RES output to the first load 130, up to a power limit of the first load 130. If a current time is a time when power is to be delivered to the third load 170, dependent upon power demands of the third load 170 and current energy prices, the EMS 105 may direct a third portion load of the RES output to the third load 170 up to a power limit of the third load 170. The EMS 105 may deliver RES output in excess of what is directed to the first load 130 and the third load 170 to the first ESS 110, up to the charging power limit of the first ESS 110 and up to a full charge of the first ESS 110. The EMS 105 may deliver RES output in excess of what is directed to the first load 130, the third load 170, and the first ESS 110 to the second ESS 165, up to the charging power limit of the second ESS 165 and up to a full charge of the second ESS 165. The EMS 105 may curtail, using inverter setpoints of the RES inverter 140, RES output in excess of the combined power limits of the first load 130 and second load if the first ESS 110 and the second ESS 165 are fully charged.

If the RES output is less than the power limit of the first load 130 and there is energy stored in the first ESS 110, the EMS 105 may set a discharge of the first ESS 110 such that the REPP 100 delivers power to the first load 130 equal to the power limit of the first load 130, limited by a rated discharge rate of the first ESS 110 and the energy stored in the first ESS 110.

If the RES output is greater than the power limit of the first load 130 but less than the combined power limit of the first load and the third load 170, and a current time is a time when power is to be delivered to the third load 170, dependent upon power demands of the third load 170 and current energy prices, the EMS 105 may set a discharge of the second ESS 165 such that the REPP 100 delivers power to the third load 170 equal to the power limit of the third load 170, limited by a rated discharge rate of the second ESS 165 and the energy stored in the second ESS 165.

Figure 3:
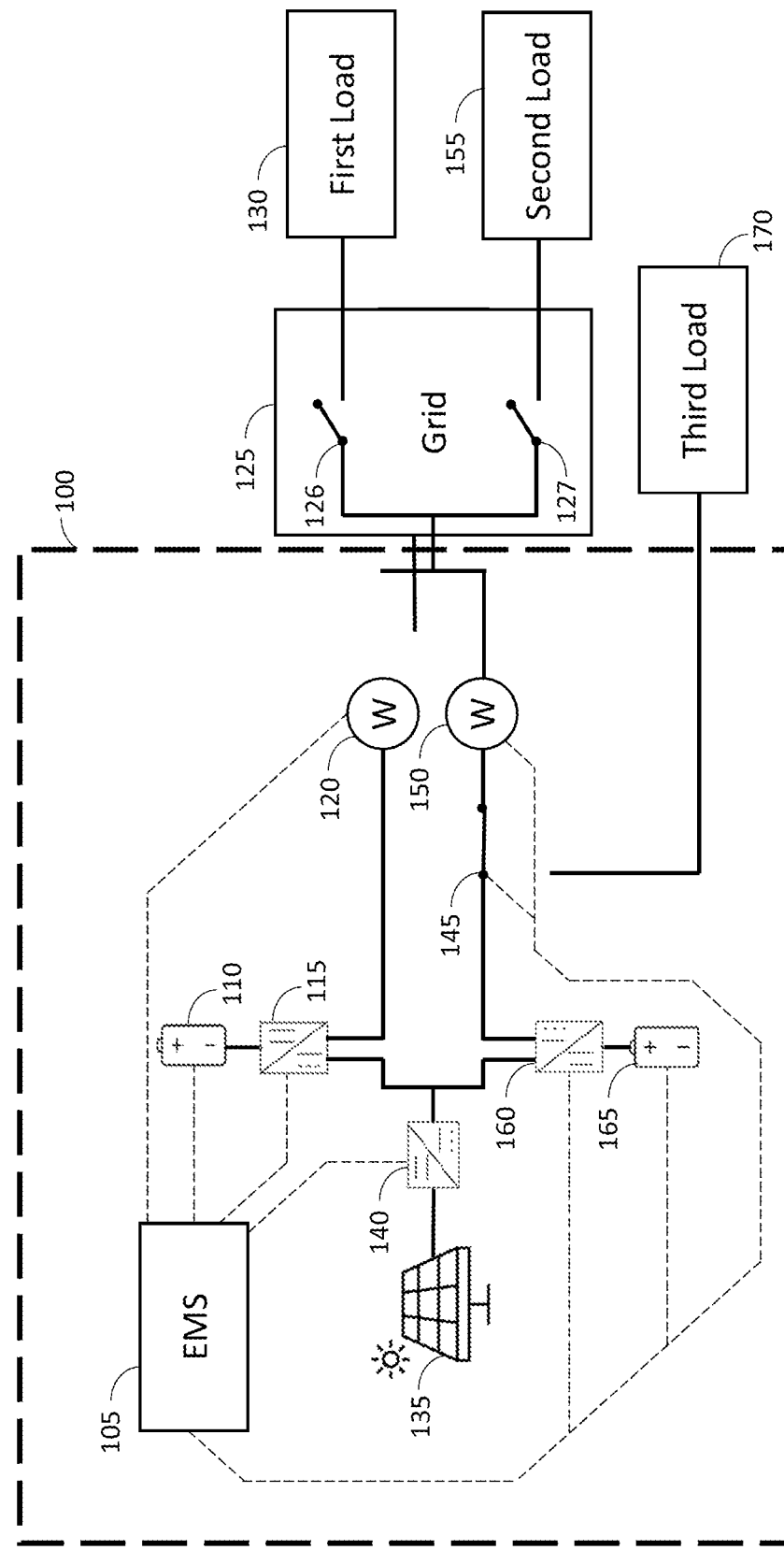
FIG. 3 is a block diagram of the REPP of FIG. 1, with a switch connecting a second ESS with a second meter.

FIG. 3 is a block diagram of the REPP of FIG. 1, with the switch 145 connecting the second ESS 165 with the second meter 150 and not connecting the second ESS 165 with the first meter 120 or the third load 170. In this configuration, the RES 135 and the second ESS 165 can supply power to the second load 155. In this configuration, the REPP 100 supplies power to the first load 130 and the second load 155 via the grid 125. For purposes of discussion, this configuration will be referred to herein as "winter mode." However, this configuration is in no way restricted to use in winter. Energy delivered through the grid is inevitably commingled on the grid. However, energy that flows through the first meter 120 may be deemed (operationally, economically, and contractually) to have been delivered to the first load 130. Similarly, energy that flows through the second meter 150 may be deemed (operationally, economically, and contractually) to have been delivered to the second load 155.

Winter mode may be used in times when the RES 135 does not produce enough daily energy in excess of the power demands of the first load 130 to fully cycle the second ESS 165. For example, a solar array may produce more power in the summer than in the winter, resulting in less power production in the winter than in the summer. When the second ESS 165 is sized to time-shift the RES output for delivery to the third load 170, a lower winter RES output is insufficient to satisfy the power demands of the third load 170.

In winter mode, the second ESS 165 may provide power capacity to the second load 155. The second ESS 165 may store energy for use by the second load 155 when demanded by the second load 155. In some embodiments, the use by the second load 155 is occasional use. The EMS 105 may direct power to the second ESS 165 to fully charge the second ESS 165. In some embodiments, the EMS 105 may charge the second ESS 165 with RES output exceeding the power demands of the first load 130. The EMS 105 may offset a self-discharge of the second ESS 165 (i.e., the tendency of the second ESS 165 to lose stored energy over time even when not discharged) by directing power from the RES 135 to the second ESS 165. Charging the second ESS 165 with RES output exceeding the power demands of the first load 130 requires the RES 135 to be sized large enough to have excess output even in times of reduced output, such as winter in the case of a solar resource. The RES 135 may be sized large enough produce RES output sufficient to satisfy the power demands of the first load 130, account for round-trip energy losses in the first ESS 110, charge the second ESS 165 over an acceptable period of time as discussed below, and maintain a charge on the second ESS 165. In other embodiments, the second ESS 165 may charge the second ESS 165 by temporarily reducing the power delivered to the first load 130. The second ESS 165, when fully charged to a readiness state of charge, may act as a short-term power source for emergency or contingency use for the second load 155. The emergency capacity offered by the second ESS 165 may allow an operator of the grid 125 to avoid keeping a fossil fuel plant online as a spinning reserve for rapid response. Instead, the grid operator could use the second ESS 165 as a spinning reserve and use the energy stored in the second ESS 165 for rapid response. Depending on a length of the emergency or contingency, the grid operator may have time to bring the fossil fuel plant online or may avoid needing to use the fossil fuel plant altogether.

Once the second ESS 165 has been discharged during an emergency or contingency, the EMS 105 may direct power from the RES 135 to the second ESS 165 to fully charge the second ESS 165. Depending on how much the RES output exceeds the power demands of the first load 130 and whether the EMS 105 decreases the power delivered to the first load 130, a time required to fully charge the second ESS 165 may be an hour, a day, a week, or any amount of time. A target amount of time for the second ESS 165 to be fully charged may be used to determine a size of the RES 135. The RES 135 may be sized to produce enough winter RES output to fully charge the second ESS 165 within the target amount of time. In some embodiments, as discussed above, the EMS 105 may reduce the power delivered to the first load 130 to more quickly charge the second ESS 165.

In some embodiments, the second ESS 165 may provide grid services such as voltage and frequency support to the grid 125 by charging and discharging the second ESS in small increments as needed. In some embodiments, the second ESS 165 may provide grid services capacity to the second load 155 to offset an impact of the second load 155 on the grid. In some embodiments, the second load 155 may communicate with the EMS 105 to coordinate the charge/discharge of the second ESS 165 with power consumption fluctuations of the second load 155.

Figure 4:
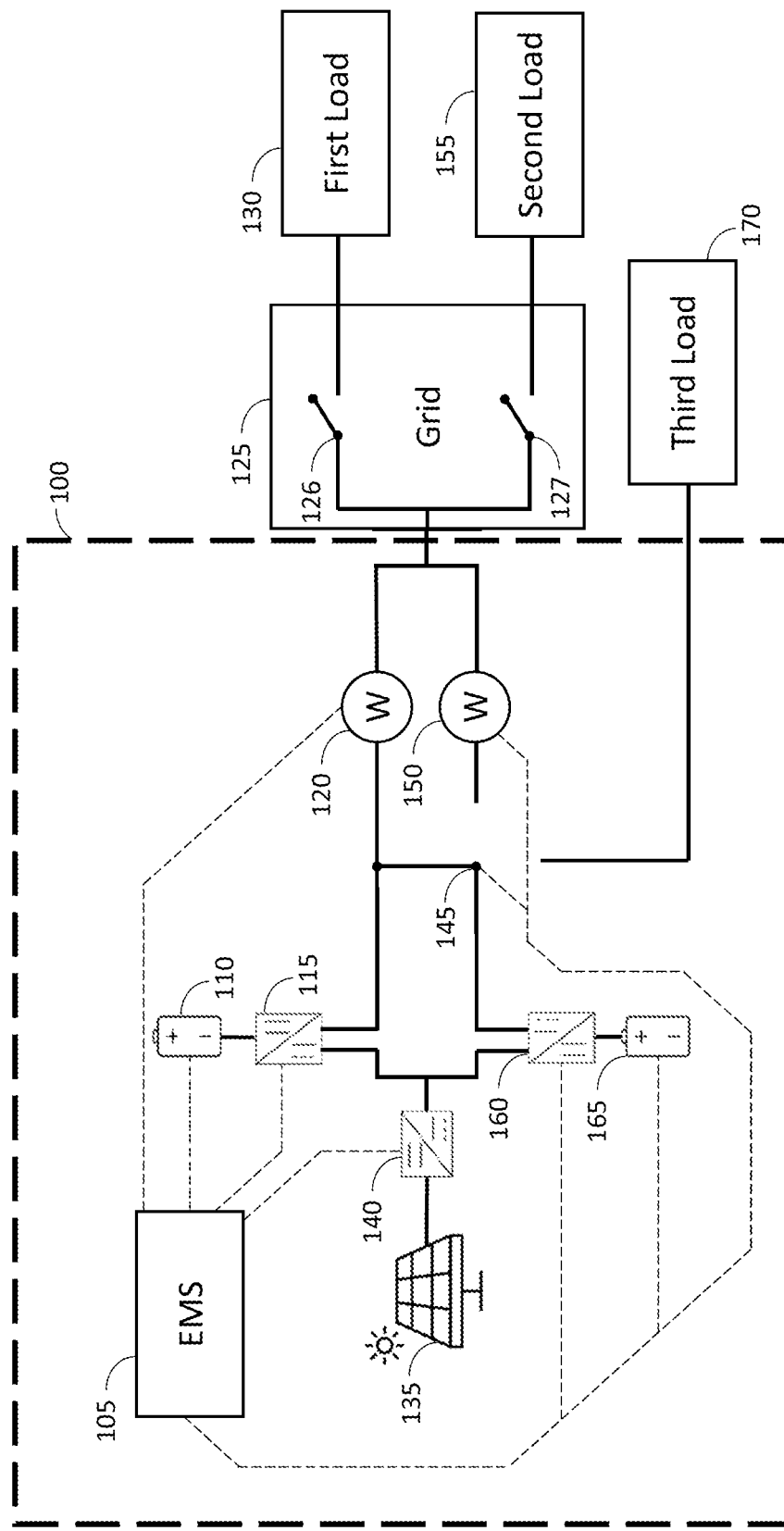
FIG. 4 is a block diagram of the REPP of FIG. 1, with a switch connecting a second ESS with a first meter.

FIG. 4 is a block diagram of the REPP 100 of FIG. 1, with the switch 145 connecting the second ESS 165 with the first meter 120 and not connecting the second ESS 165 with the second meter 150 or the third load 170. In this configuration, the RES 135, the first ESS 110, and the second ESS 165 can supply power to the first load 130 via the grid 125. For purposes of discussion, this configuration will be referred to herein as "focus mode." However, this term is in no way limiting.

In some embodiments, focus mode may be used when greater storage capacity than is provided by the first ESS 110 is required by the first load 130. For example, the RES output may be great enough or timed such that the first ESS 110 is unable to time-shift the RES output sufficient to satisfy the power demands of the first load 130. The second ESS 165 may assist the first ESS 110 in time-shifting the RES output to satisfy the power demands of the first load 130. In some embodiments, focus mode may be used in summer when the RES output is greater than can be time-shifted by the first ESS 110 and summer mode may be used in fall and spring when the RES output can be time-shifted by the first ESS 110 alone.

In some embodiments, focus mode may be used when the first load 130 requires energy storage capacity. The second ESS 165 may be charged to a state of readiness as in winter mode and may provide power to the first load 130 as demanded. Focus mode, with the second ESS 165 providing capacity to the first load 130, may be used in any season. Furthermore, although summer mode and winter mode are described as providing power to the third load 170 and capacity to the second load 155, respectively, the EMS 105 may control the REPP 100 according to summer mode to provide power to the second load 155 and capacity to the third load 170, respectively.

The EMS 105 may actuate the switch 145 to modify a configuration of the REPP 100 to be in summer mode, winter mode, or focus mode. The EMS 105 may actuate the switch 145 to electrically decouple the second ESS 160 from whatever it is connected to, such as the third load 170, the second meter 150, or the first meter 120. The EMS 105 may actuate the switch 145, as discussed herein, based on the trigger condition. In some embodiments, the trigger condition may be a termination of a time period. The time period may be a season. For example, the EMS 105 may actuate the switch 145 based on summer ending and fall beginning or based on spring ending and summer beginning. In other embodiments, the trigger condition may be the RES output, such as a daily average RES output, falling below or rising above a predefined threshold. In some embodiments, the predefined threshold may be based on power demands of the first load 130. In an example, the EMS 105 may actuate the switch 145 based on the RES output falling below a threshold such that the RES 135 does not produce enough daily energy to satisfy the power demands of the first load 130 and satisfy power demands of the second load 155 and the third load 170. In another example, the EMS 105 may actuate the switch 145 based on the RES output rising above a threshold such that the RES 135 produces enough daily energy to satisfy the power demands of the first load 130 and satisfy power demands of the second load 155 and the third load 170.

Figure 5:
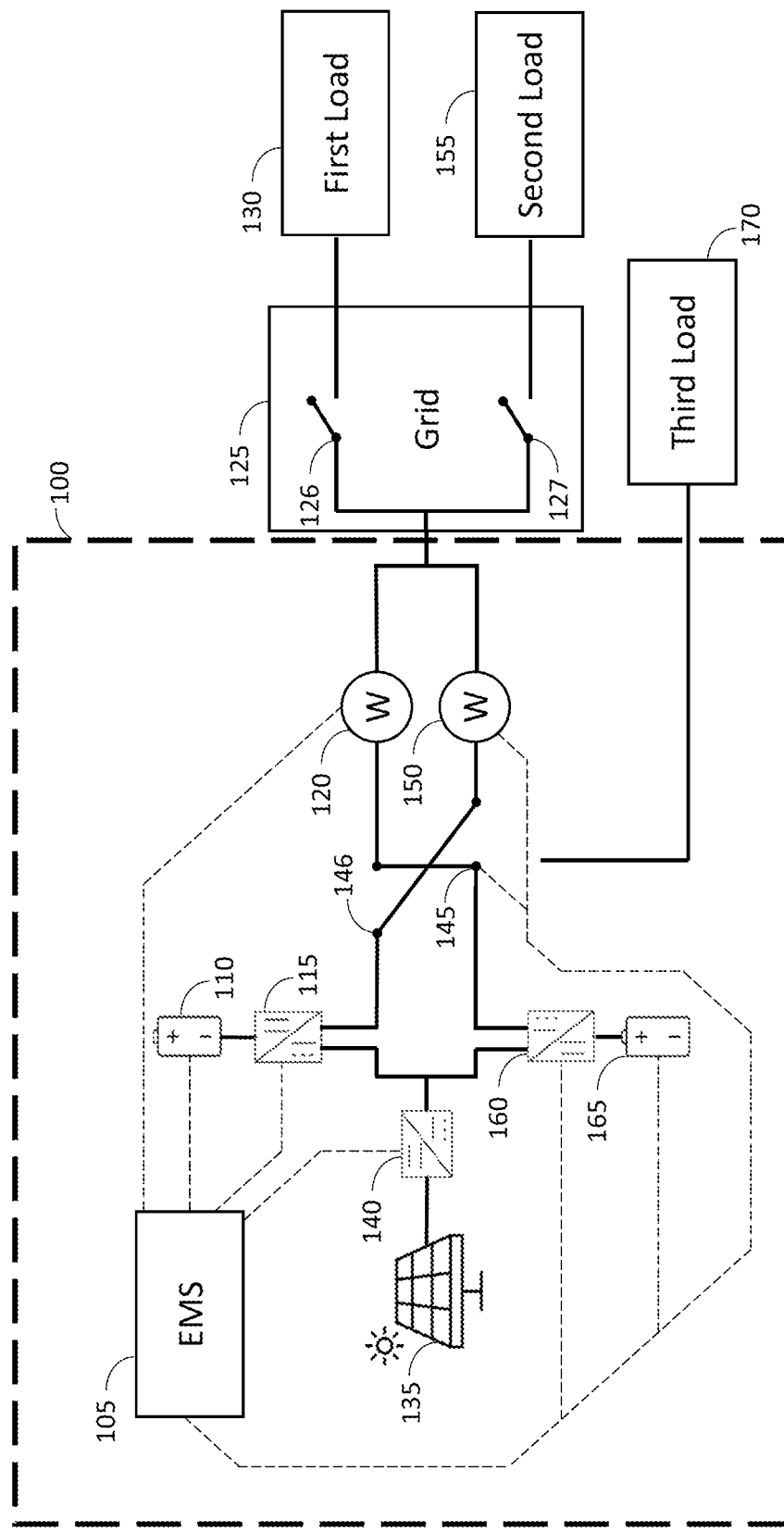
FIG. 5 is a block diagram of the REPP of FIG. 1, with a second switch connecting a first ESS with a second meter.

FIG. 5 is a block diagram of the REPP of FIG. 1, with a second switch 146 connecting the first ESS 110 with the second meter 150. The EMS 105 may connect the first ESS 110 with the second meter 150 and the second ESS 165 with the first meter 120 in order to swap a use of the first ESS 110 and the second ESS 165. The first ESS 110 may be used to provide capacity to the second load 155 and the second ESS 165 may be used to time-shift the RES output to satisfy the power demands of the first load 130. The EMS 105 may similarly swap the uses of the first ESS 110 and the second ESS 165 in the summer and winter modes, connecting the first ESS 110 to the third load 170 and the second ESS 165 to the first meter 120 in the summer mode and connecting the first ESS to the second load 155 and the second ESS 165 to the first load 130 in the winter mode. The EMS 105 may alter the connections of the first ESS 110 and the second ESS 165 by actuating the switch 145 and/or the second switch. Alternating uses of the first ESS 110 and the second ESS 160 may be used to levelize a degradation of the first ESS 110 and the second ESS 160. ESS degradation may include a reduced total storage capacity, a reduced maximum charge/discharge rate, and/or an increased self-discharge rate. Levelizing the degradation of the first ESS 110 and the second ESS 165 may include monitoring a first ESS degradation and a second ESS degradation and altering a first ESS use and a second ESS use such that the first ESS degradation is equal to the second ESS degradation. Different uses for the first ES S 110 and the second ES S 165 may result in different levels of degradation. In some embodiments, levelizing the degradation of the first ESS 110 and the second ESS 165 may include equalizing a first amount the first ESS 110 and the second ESS 165 are used for a first use and a second amount the first ESS 110 and the second ESS 165 are used for a second use. For example, an ESS may degrade faster if it is cycled daily than if it were used to provided capacity. In this example, if the first ESS 110 is cycled daily to time-shift the RES output while the second ESS 165 is used to provide capacity, the first ESS 110 will degrade faster. In this example, the first ESS 110 and the second ESS 165 may be levelized by cycling the second ESS 165 daily to time-shift the RES output while using the first ESS 110 to provide capacity such that the first ESS degradation is equal to the second ESS degradation. Actuating the switch 145 and the second switch 146 to alternate uses of the first ESS 110 and the second ESS 165 may reduce a difference in degradation rates and/or degradation of the first ESS 110 and the second ESS 165. The switch 145 and the second switch 146 may be actuated periodically to alternate uses of the first and second ESSs 110, 165, such as seasonally or annually.

Figure 6:
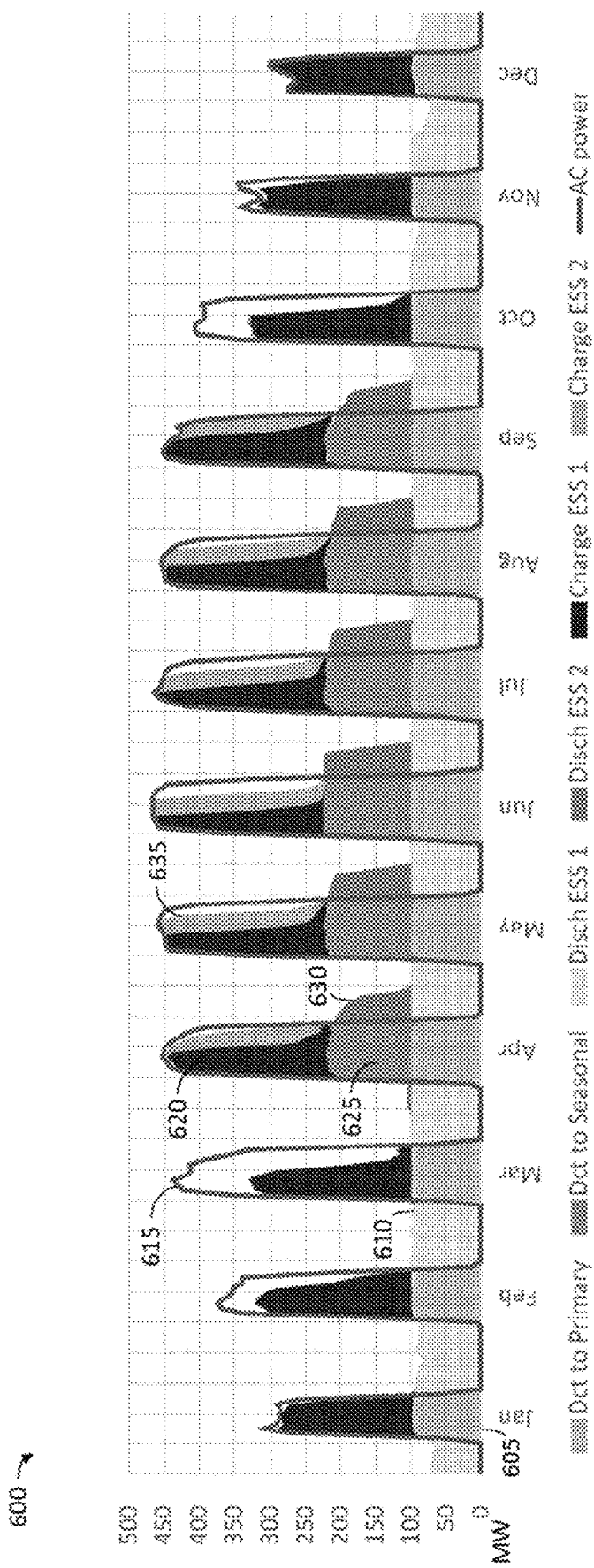
FIG. 6 illustrates an example power allocation of an example REPP.

FIG. 6 illustrates an example power allocation 600 of an REPP. The REPP may be the REPP 100 of FIG. 1. The power allocation 600 may show power for one year, where each month is represented by 24 hours, with each plotted quantity at an hour representing an average value of the quantity in the hour across all days of the month. For example, January includes a peak, where the peak represents power generated and allocated each hour of an average day in January. In this example, the RES is a solar resource, causing RES output to follow a peaked pattern corresponding to daytime sunlight. In an example, the power allocation 600 is power allocated from a 540 MWdc/450 MWac RES to a 100 MW primary load and a 125 MW secondary load.

The power allocation 600 may include a primary load allocation 605, a first ESS discharge 610, total AC power 615, a first ESS charge 620, a secondary load allocation 625, a second ESS discharge 630, and a second ESS charge 635. The total AC power 615 may be a potential total RES output. The primary load allocation 605 may be RES output delivered directly from the RES to a primary load. The secondary load allocation 625 may be RES output delivered directly from the RES to a secondary load. The first ESS charge 620 may be RES output allocated to charging a first ESS. The first ESS discharge 610 may be power delivered by discharging the first ESS. The second ESS charge 620 may be RES output allocated to charging a second ESS. The second ESS discharge 630 may be power delivered by discharging the second ESS. In some embodiments, the first ESS discharge 610 may be power delivered to the primary load and the second ESS discharge 630 may be power delivered to the secondary load.

In some embodiments, the primary load allocation 605 and the first ESS discharge 610 provide power to the primary load. The primary load allocation 605 and the first ESS discharge 610 may provide a substantially constant amount of power to the primary load. The first ESS may time-shift RES output to provide the substantially constant amount of power to the primary load. For example, the primary load allocation 605 and the first ESS discharge 610 may provide 100 MW to the primary load year-round with a 97% capacity factor.

In some embodiments, the secondary load allocation 625 and the second ESS discharge 630 provide power to the secondary load. In April through September, the secondary load allocation 625 and the second ESS discharge 630 may provide a substantially constant amount of power to the secondary load for a set period each day. For example, the secondary load allocation 625 and the second ESS discharge 630 may provide 125 MW to the secondary load for the set period each day. The second ESS may time-shift RES output to provide the substantially constant amount of power to the secondary load for the set period each day. In an example, the secondary load allocation 625 and the second ESS discharge 630 provide roughly 120 MW to the second load for 18 hours per day, in April, May, June, July, August, and September, with higher reliability in April, May, June, and July, and lower reliability in August and September. In January, February, March, October, November, and December, the secondary load allocation 625 and the second ESS discharge 630 do not provide power to the secondary load, and no power is delivered to the secondary load. This difference in power delivery to the secondary load may be an example of the winter mode, as discussed herein. The secondary load may be seasonal, in that it receives power only in a certain season, such as summer.

The second ESS charge 635 may be greater than zero in January, February, March, October, November, and December. The second ESS charge 635 may be a trickle charge to maintain a charge of the second ESS for the second ESS to provide capacity.

In an example, 82% of the total AC power 615 is allocated to the primary load allocation 605, the secondary load allocation 625, the first ESS charge 620, or the second ESS charge 635, and 12% of the total AC power 615 is curtailed. Due to losses in the first and second ESSs, approximately 82% of the total AC power 615 is delivered to the primary and secondary loads.

Figure 7:
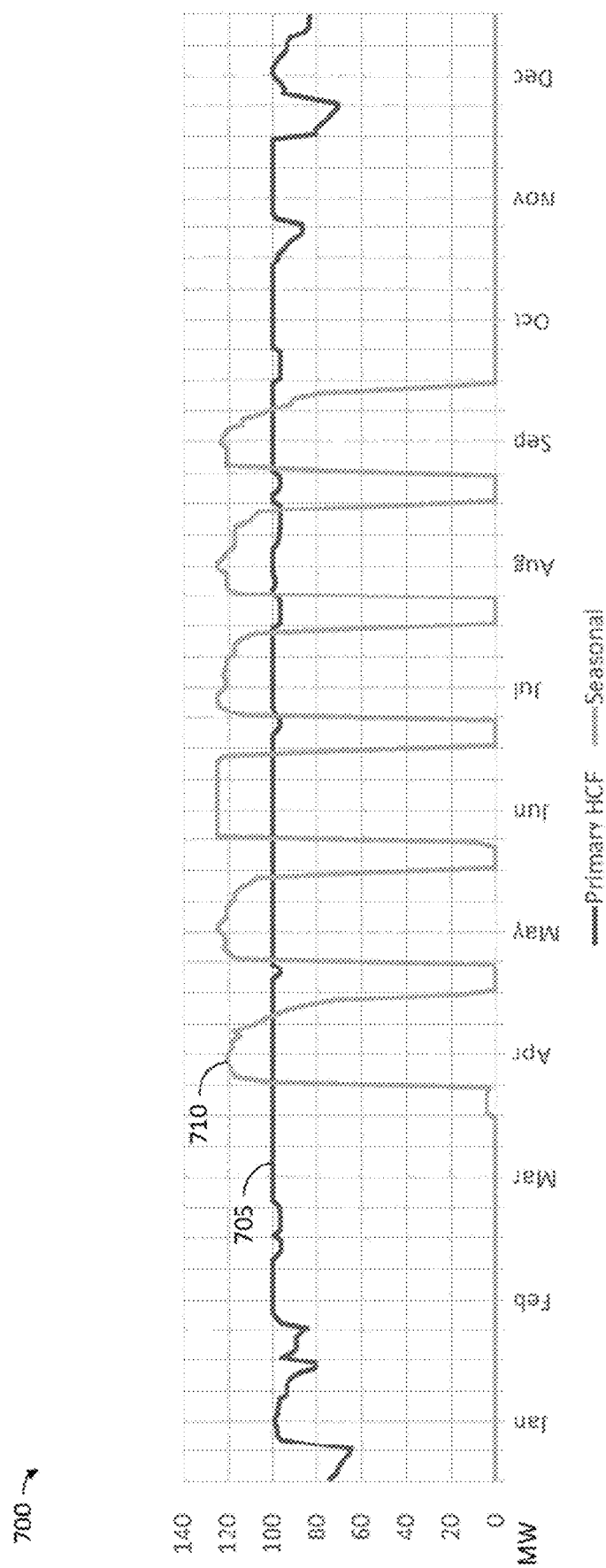
FIG. 7 illustrates an example power delivery of the REPP of FIG. 6.

FIG. 7 illustrates an example power delivery 700 of the REPP as allocated in the power allocation 600 of FIG. 6. The power delivery 700 is shown in the same format as FIG. 6, with each month represented by 24 hours and each plotted quantity at an hour representing an average value of the quantity in the hour across all days of the month. The primary load power 705 is substantially constant, with higher reliability in April, May, June, July, August, and September, and lower reliability in January, February, March, October, November, and December. In an example, the primary load power 705 is 100 MW year-round with a 97% capacity factor. The secondary load power 710 is substantially constant for a fixed portion of each day in April, May, June, July, August, and September, and zero in January, February, March, October, November, and December. For example, the secondary load power 710 is 120 MW for 18 hours per day, in April, May, June, July, August, and September, with higher reliability in April, May, June, and July, and lower reliability in August and September. In some embodiments, power may be delivered to the second load during more, fewer, or different months.

Figure 8:
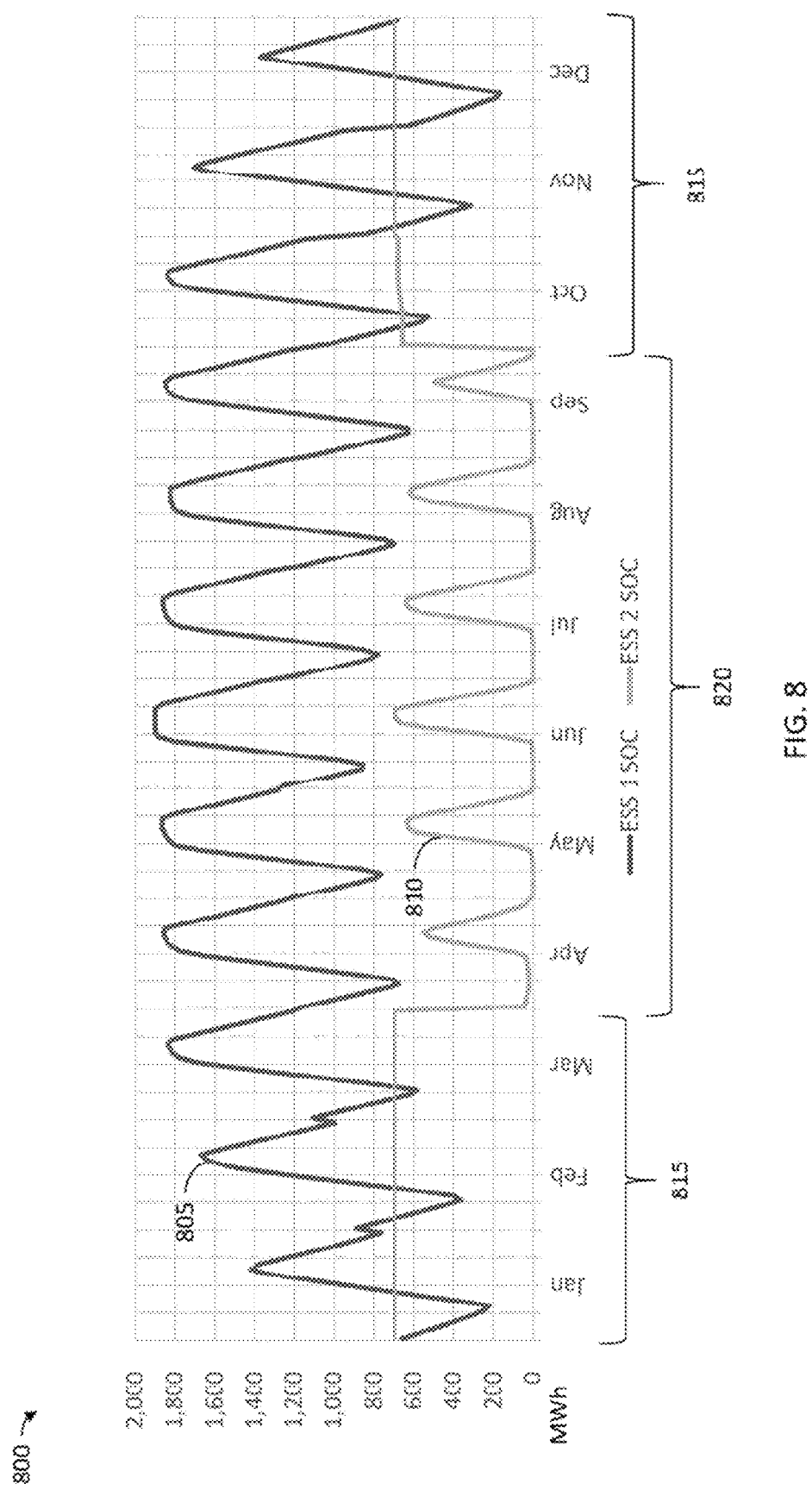
FIG. 8 illustrates example states of charge of the first ESS and the second ESS of FIG. 6.

FIG. 8 illustrates an example first ESS state of charge (SOC) 805 and an example second ESS SOC 810 of the first ESS and the second ESS, respectively, of FIG. 6. The first ESS SOC 805 and second ESS SOC 810 are shown in the same format as FIG. 6, with each month represented by 24 hours and each plotted quantity at an hour representing an average value of the quantity in the hour across all days of the month, and with a difference in the y-axis denoting MWh instead of MW. The first ESS SOC 805 may cycle daily, rising as the first ESS is charged by the ESS and falling as the first ESS is discharged. The first ESS SOC 805 may be higher in April, May, June, July, August, and September than in January, February, March, October, November, and December. The first ESS SOC 805 reflects the first ESS time-shifting RES output to provide substantially constant power to the first load. In an example, the first ESS SOC 805 has a typical cycle depth of 1.2 GWH against a total storage capacity of 1.9 GWh. While the first ESS SOC 805 does not equal zero at any point, showing an average of each day in month, the first ESS SOC 805 may equal zero, meaning the first ESS is fully discharged, on individual days contributing to the daily average first ESS SOC 805 shown here.

The second ESS SOC 810 may include a capacity period 815 and an energy period 820. In some embodiments, the second ESS SOC 810 may include multiple capacity periods and multiple energy periods 820. The capacity period 815 may cover October, November, December, January, February, and March. The energy period 820 may cover April, May, June, July, August, and September. During the energy period 820, the second ESS may provide energy and during the capacity period 815, the second ESS may provide capacity. During the energy period, the second ESS SOC 810 may cycle daily, rising as the second ESS is charged by the ESS and falling as the second ESS is discharged. The second ESS SOC 810 during the energy period 820 represents the second ESS time-shifting RES output to provide substantially constant power for the fixed portion each day to the second load. In an example, the second ESS SOC 810 has a typical cycle depth ranging from approximately 550 MWh in April to 700 MWh in June against a total storage capacity of 700 MWh. The second ESS SOC 810 may reach zero each day, meaning the second ESS is fully discharged.

In the capacity period 815, on most days, no energy is delivered to the secondary load and the second ESS SOC 810 remains constant. In some embodiments, the second ESS SOC 810 remains constant at a full storage capacity of the second ESS. In an example, the second ESS SOC 810 remains constant at 700 MWh, the full storage capacity of the second ESS. The second ESS may provide capacity to the grid by maintaining the second ESS SOC 810 available for use. The second ESS may provide spinning reserve to the grid. In other embodiments, the second ESS SOC 810 may be maintained at a level lower than the full storage capacity of the second ESS. The second ESS may provide grid services to the grid using some or all of its unused capacity.

Figure 9:
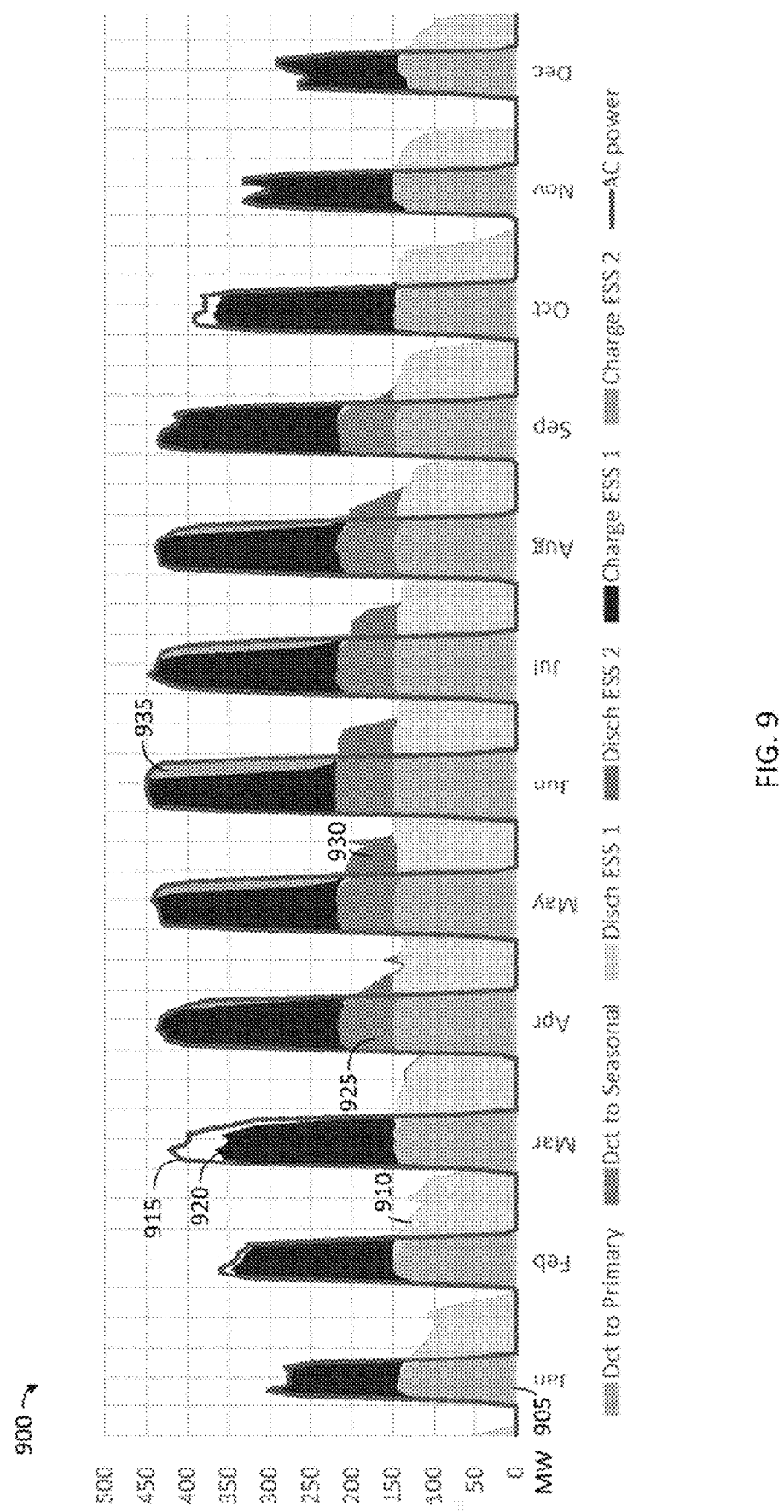
FIG. 9 illustrates an example power allocation of another example REPP.

FIG. 9 illustrates an example power allocation 900 of an REPP. The REPP may be the REPP 100 of FIG. 1. The power allocation 900 may show power for one year, where each month is represented by 24 hours, with each plotted quantity at an hour representing an average value of the quantity in the hour across all days of the month. For example, January includes a peak, where the peak represents power generated and allocated each hour of an average day in January. In this example, the RES is a solar resource, causing RES output to follow a peaked pattern corresponding to daytime sunlight. In an example, the power allocation 900 is power allocated from a 540 MWdc/450 MWac RES to a 150 MW primary load and a 170 MW secondary load.

The power allocation 900 may include a primary load allocation 905, a first ESS discharge 910, total potential AC power 915, a first ESS charge 920, a secondary load allocation 925, a second ESS discharge 930, and a second ESS charge 935. The total potential AC power 915 may be a potential total RES output. The primary load allocation 905 may be RES output delivered directly from the RES to a primary load. The secondary load allocation 925 may be RES output delivered directly from the RES to a secondary load. The first ESS charge 920 may be RES output allocated to charging a first ESS. The first ESS discharge 910 may be power delivered by discharging the first ESS. The second ESS charge 920 may be RES output allocated to charging a second ESS. The second ESS discharge 930 may be power delivered by discharging the second ESS. In some embodiments, the first ESS discharge 910 may be power delivered to the primary load and the second ESS discharge 930 may be power delivered to the secondary load.

In some embodiments, the primary load allocation 905 and the first ESS discharge 910 provide power to the primary load. The primary load allocation 905 and the first ESS discharge 910 may provide a substantially constant amount of power to the primary load. The first ESS may time-shift RES output to provide the substantially constant amount of power to the primary load. For example, the primary load allocation 905 and the first ESS discharge 910 may provide 150 MW to the primary load year-round with an 85% capacity factor.

In some embodiments, the secondary load allocation 925 and the second ESS discharge 930 provide power to the secondary load. In April through September, the secondary load allocation 925 and the second ESS discharge 930 may provide a substantially constant amount of power to the secondary load for a set period each day. For example, the secondary load allocation 925 and the second ESS discharge 930 may provide 125 MW to the secondary load for the set period each day. The second ESS may time-shift RES output to provide the substantially constant amount of power to the secondary load for the set period each day. In January, February, March, October, November, and December, the secondary load allocation 925 and the second ESS discharge 930 do not provide power to the secondary load, and no power is delivered to the secondary load. This difference in power delivery to the secondary load may be an example of the winter mode, as discussed herein. The secondary load may be seasonal, in that it receives power only in a certain season, such as summer.

The second ESS charge 935 may be greater than zero in January, February, March, October, November, and December. The second ESS charge 935 may be a trickle charge to maintain a charge of the second ESS for the second ESS to provide capacity.

In an example, 98% of the total AC power 915 is allocated to the primary load allocation 905, the secondary load allocation 925, the first ESS charge 920, or the second ESS charge 935, and 2% of the total AC power 915 is curtailed. Due to losses in the first and second ESSs, approximately 92% of the total AC power 915 is delivered to the primary and secondary loads.

Figure 10:
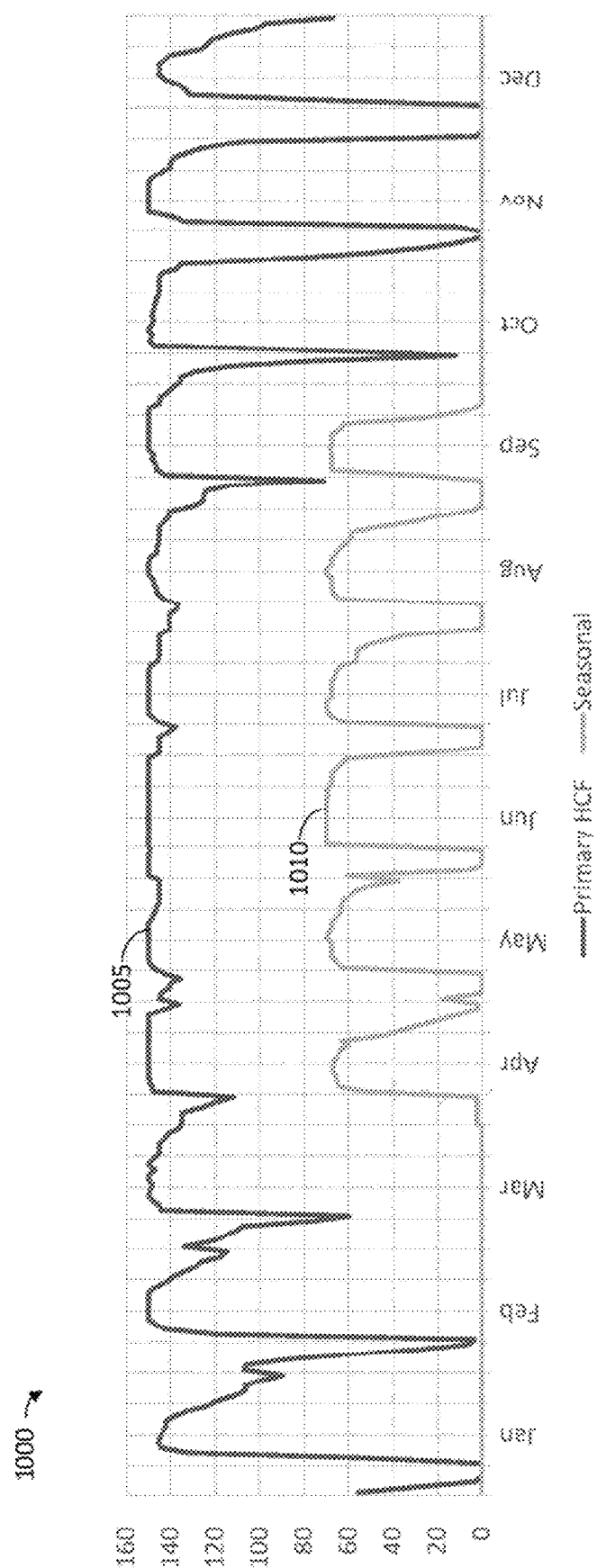
FIG. 10 illustrates an example power delivery of the REPP of FIG. 9.

FIG. 10 illustrates an example power delivery 1000 of the REPP as allocated in the power allocation 900 of FIG. 9. The power delivery 1000 is shown in the same format as FIG. 9, with each month represented by 24 hours and each plotted quantity at an hour representing an average value of the quantity in the hour across all days of the month. The primary load power 1005 is substantially constant, with higher reliability in April, May, June, July, August, and September, and lower reliability in January, February, March, October, November, and December. The secondary load power 1010 is substantially constant in April, May, June, July, August, and September, and zero in January, February, March, October, November, and December. In some embodiments, power may be delivered to the second load during more, fewer, or different months.

Figure 11:
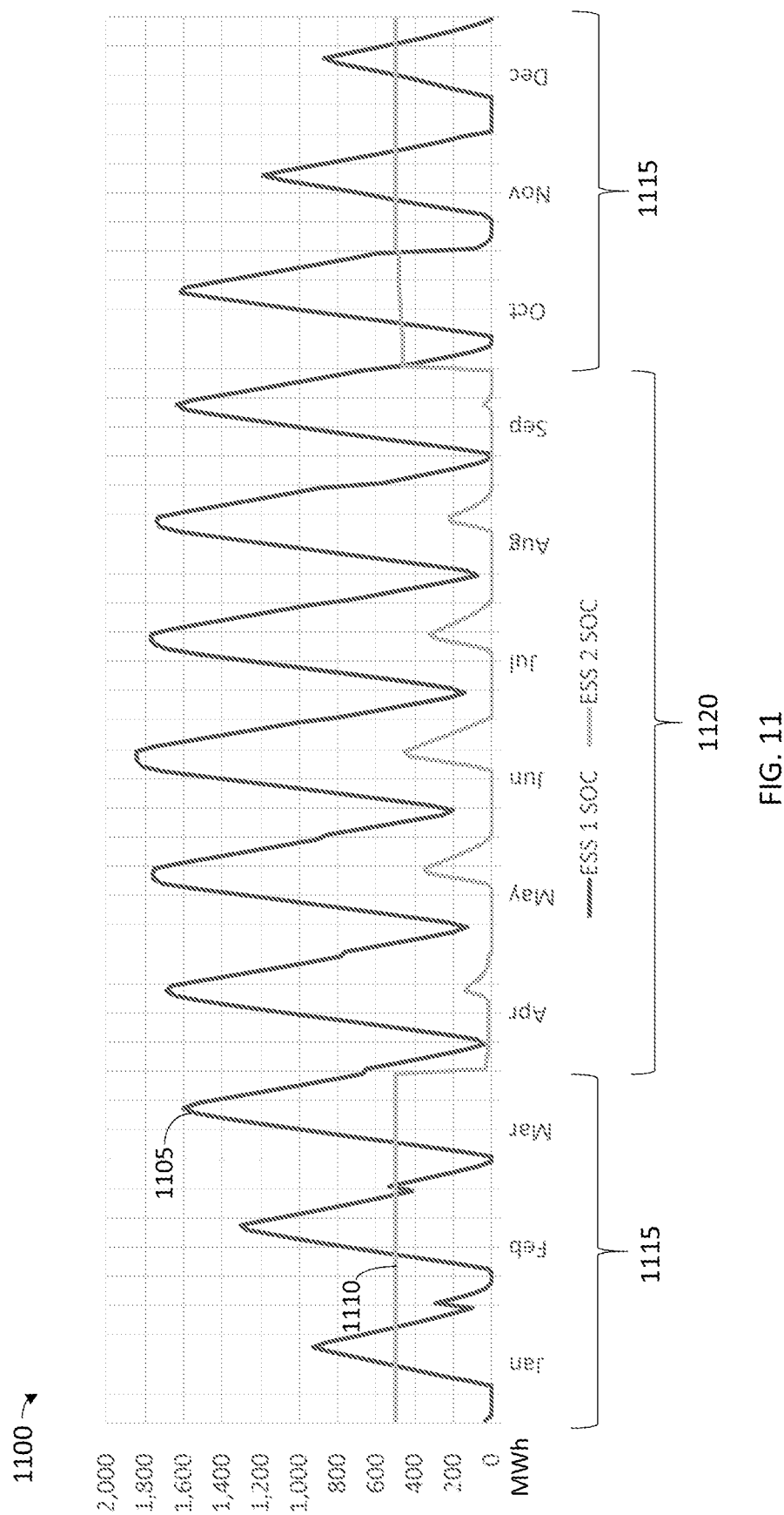
FIG. 11 illustrates example states of charge of the first ESS and the second ESS of FIG. 9.

FIG. 11 illustrates an example first ESS state of charge (SOC) 1105 and an example second ESS SOC 1110 of the first ESS and the second ESS, respectively, of FIG. 9. The first ESS SOC 1105 and second ESS SOC 1110 are shown in the same format as FIG. 9, with each month represented by 24 hours and each plotted quantity at an hour representing an average value of the quantity in the hour across all days of the month, and with a difference in the y-axis denoting MWh instead of MW. The first ESS SOC 1105 may cycle daily, rising as the first ESS is charged by the ESS and falling as the first ESS is discharged. The first ESS SOC 1105 may be higher in April, May, June, July, August, and September than in January, February, March, October, November, and December. The first ESS SOC 1105 reflects the first ESS time-shifting RES output to provide substantially constant power to the first load. The first ESS SOC 1105 may equal zero, meaning the first ESS is fully discharged.

The second ESS SOC 1110 may include a capacity period 1115 and an energy period 1120. In some embodiments, the second ESS SOC 1110 may include multiple capacity periods and multiple energy periods 1120. The capacity period 1115 may cover October, November, December, January, February, and March. The energy period 1120 may cover April, May, June, July, August, and September. During the energy period 1120, the second ESS may provide energy and during the capacity period 1115, the second ESS may provide capacity. During the energy period, the second ESS SOC 1110 may cycle daily, rising as the second ESS is charged by the ESS and falling as the second ESS is discharged. The second ESS SOC 1110 during the energy period 1120 represents the second ESS time-shifting RES output to provide substantially constant power to the second load. The second ESS SOC 1110 may reach zero each day, meaning the second ESS is fully discharged. In an example, the second ESS SOC 1110 has a typical cycle depth ranging from approximately 180 MWh in April to 450 MWh in June against a total storage capacity of 500 MWh.

In the capacity period 1115, no energy is delivered to the secondary load and the second ESS SOC 1110 remains constant. In some embodiments, the second ESS SOC 1110 remains constant at a full storage capacity of the second ESS. The second ESS may provide capacity to the grid by maintaining the second ESS SOC 1110 available for use. The second ESS may provide spinning reserve to the grid. In other embodiments, the second ESS SOC 1110 may be maintained at a level lower than the full storage capacity of the second ESS. The second ESS may provide grid services to the grid using some or all of its unused capacity.

Figure 12:
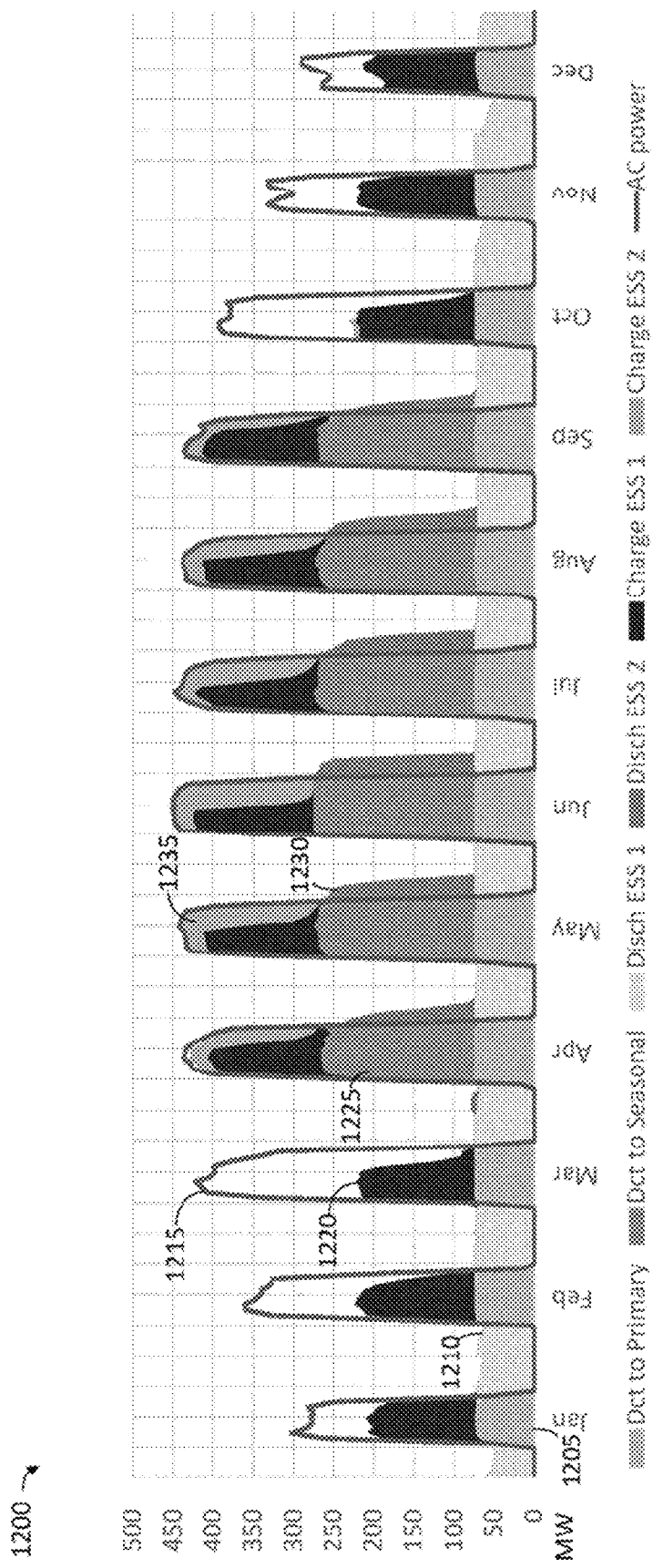
FIG. 12 illustrates an example power allocation of another example REPP.

FIG. 12 illustrates an example power allocation 1200 of an REPP. The REPP may be the REPP 100 of FIG. 1. The power allocation 1200 may show power for one year, where each month is represented by 24 hours, with each plotted quantity at an hour representing an average value of the quantity in the hour across all days of the month. For example, January includes a peak, where the peak represents power generated and allocated each hour of an average day in January. In this example, the RES is a solar resource, causing RES output to follow a peaked pattern corresponding to daytime sunlight. In an example, the power allocation 1200 is power allocated from a 540 MWdc/450 MWac RES to a 75 MW primary load and a 200 MW secondary load.

The power allocation 1200 may include a primary load allocation 1205, a first ESS discharge 1210, total potential AC power 1215, a first ESS charge 1220, a secondary load allocation 1225, a second ESS discharge 1230, and a second ESS charge 1235. The total potential AC power 1215 may be a potential total RES output. The primary load allocation 1205 may be RES output delivered directly from the RES to a primary load. The secondary load allocation 1225 may be RES output delivered directly from the RES to a secondary load. The first ESS charge 1220 may be RES output allocated to charging a first ESS. The first ESS discharge 1210 may be power delivered by discharging the first ESS. The second ESS charge 1220 may be RES output allocated to charging a second ESS. The second ESS discharge 1230 may be power delivered by discharging the second ESS. In some embodiments, the first ESS discharge 1210 may be power delivered to the primary load and the second ESS discharge 1230 may be power delivered to the secondary load.

In some embodiments, the primary load allocation 1205 and the first ESS discharge 1210 provide power to the primary load. The primary load allocation 1205 and the first ESS discharge 1210 may provide a substantially constant amount of power to the primary load. The first ESS may time-shift RES output to provide the substantially constant amount of power to the primary load. For example, the primary load allocation 1205 and the first ESS discharge 1210 may provide 150 MW to the primary load year-round with an 85% capacity factor.

In some embodiments, the secondary load allocation 1225 and the second ESS discharge 1230 provide power to the secondary load. In April through September, the secondary load allocation 1225 and the second ESS discharge 1230 may provide a substantially constant amount of power to the secondary load for a set period each day. For example, the secondary load allocation 1225 and the second ESS discharge 1230 may provide 125 MW to the secondary load for the set period each day. The second ESS may time-shift RES output to provide the substantially constant amount of power to the secondary load for the set period each day. In January, February, March, October, November, and December, the secondary load allocation 1225 and the second ESS discharge 1230 do not provide power to the secondary load, and no power is delivered to the secondary load. This difference in power delivery to the secondary load may be an example of the winter mode, as discussed herein. The secondary load may be seasonal, in that it receives power only in a certain season, such as summer.

The second ESS charge 1235 may be greater than zero in January, February, March, October, November, and December. The second ESS charge 1235 may be a trickle charge to maintain a charge of the second ESS for the second ESS to provide capacity.

In an example, 85% of the total AC power 1215 is allocated to the primary load allocation 1205, the secondary load allocation 1225, the first ESS charge 1220, or the second ESS charge 1235, and 15% of the total AC power 1215 is curtailed. Due to losses in the first and second ESSs, approximately 81% of the total AC power 1215 is delivered to the primary and secondary loads.

Figure 13:
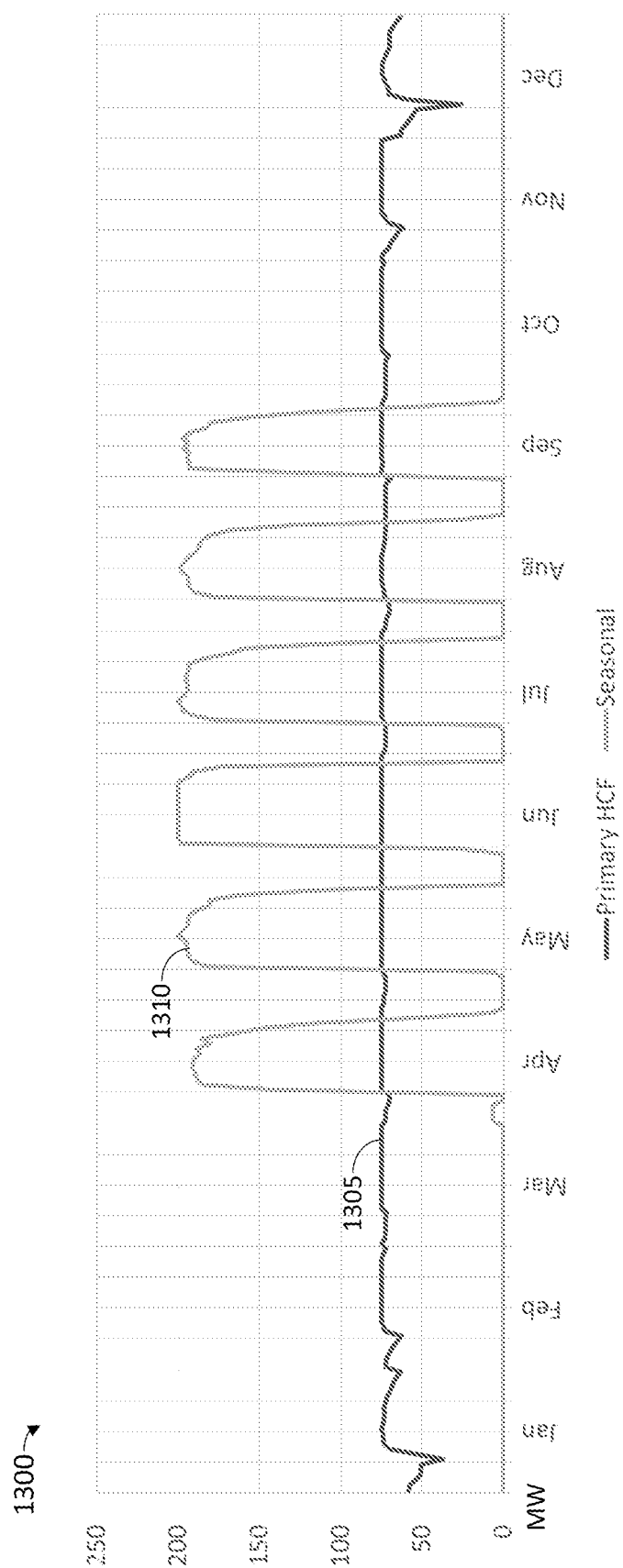
FIG. 13 illustrates an example power delivery of the REPP of FIG. 13.

FIG. 13 illustrates an example power delivery 1300 of the REPP as allocated in the power allocation 1200 of FIG. 12. The power delivery 1300 is shown in the same format as FIG. 12, with each month represented by 24 hours and each plotted quantity at an hour representing an average value of the quantity in the hour across all days of the month. The primary load power 1305 is substantially constant, with higher reliability in April, May, June, July, August, and September, and lower reliability in January, February, March, October, November, and December. The secondary load power 1310 is substantially constant in April, May, June, July, August, and September, and zero in January, February, March, October, November, and December. In some embodiments, power may be delivered to the second load during more, fewer, or different months.

Figure 14:
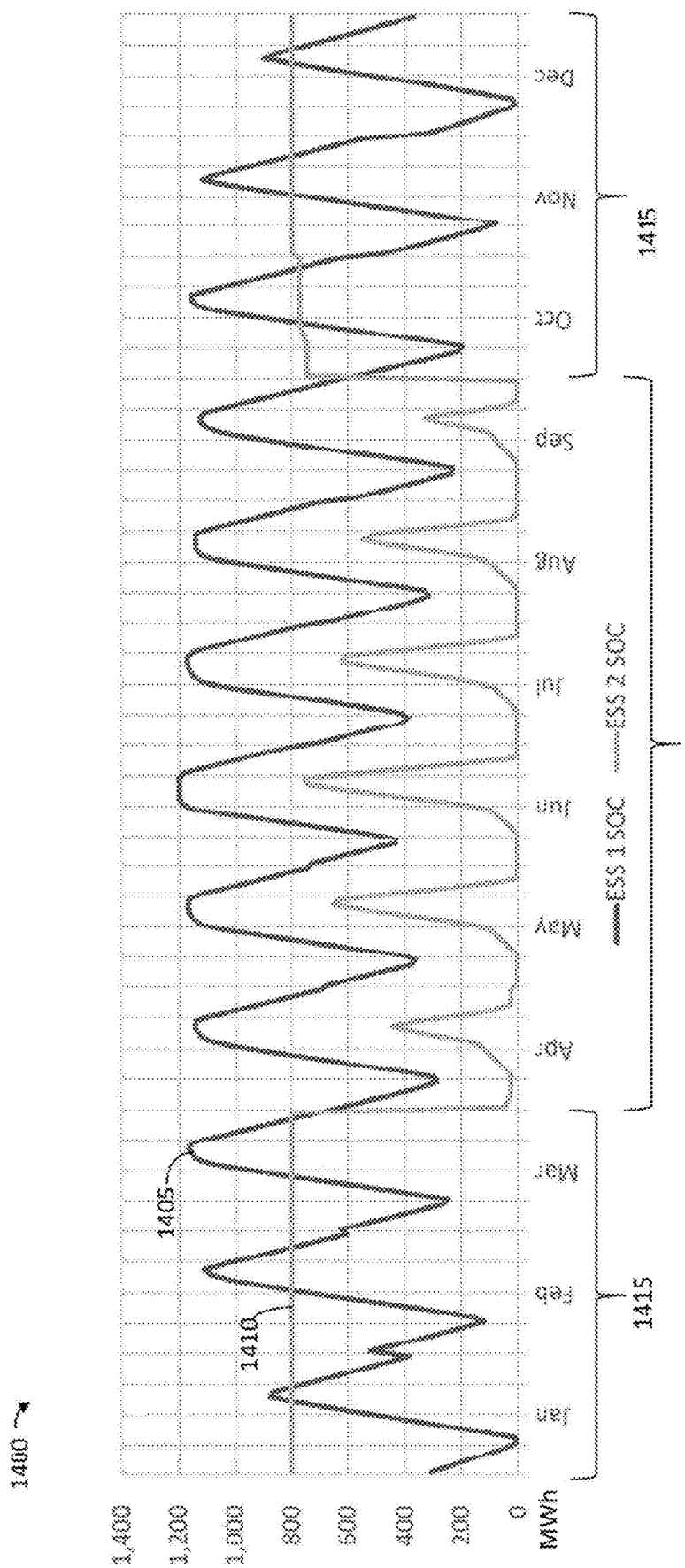
FIG. 14 illustrates example states of charge of the first ESS and the second ESS of FIG. 12.

FIG. 14 illustrates an example first ESS state of charge (SOC) 1105 and an example second ESS SOC 1410 of the first ESS and the second ESS, respectively, of FIG. 12. The first ESS SOC 1405 and second ESS SOC 1410 are shown in the same format as FIG. 12, with each month represented by 24 hours and each plotted quantity at an hour representing an average value of the quantity in the hour across all days of the month, and with a difference in the y-axis denoting MWh instead of MW. The first ESS SOC 1405 may cycle daily, rising as the first ESS is charged by the ESS and falling as the first ESS is discharged. The first ESS SOC 1405 may be higher in April, May, June, July, August, and September than in January, February, March, October, November, and December. The first ESS SOC 1405 reflects the first ESS time-shifting RES output to provide substantially constant power to the first load. The first ESS SOC 1405 may equal zero, meaning the first ESS is fully discharged.

The second ESS SOC 1410 may include a capacity period 1415 and an energy period 1420. In some embodiments, the second ESS SOC 1410 may include multiple capacity periods and multiple energy periods 1420. The capacity period 1415 may cover October, November, December, January, February, and March. The energy period 1420 may cover April, May, June, July, August, and September. During the energy period 1420, the second ESS may provide energy and during the capacity period 1415, the second ESS may provide capacity. During the energy period, the second ESS SOC 1410 may cycle daily, rising as the second ESS is charged by the RES and falling as the second ESS is discharged. The second ESS SOC 1410 during the energy period 1420 represents the second ESS time-shifting RES output to provide substantially constant power to the second load. The second ESS SOC 1410 may reach zero each day, meaning the second ESS is fully discharged. In an example, the second ESS SOC 1410 has a typical cycle depth ranging from approximately 400 MWh in April to 750 MWh in June against a total storage capacity of 800 MWh.

In the capacity period 1415, no energy is delivered to the secondary load and the second ESS SOC 1410 remains constant. In some embodiments, the second ESS SOC 1410 remains constant at a full storage capacity of the second ESS. The second ESS may provide capacity to the grid by maintaining the second ESS SOC 1410 available for use. The second ESS may provide spinning reserve to the grid. In other embodiments, the second ESS SOC 1410 may be maintained at a level lower than the full storage capacity of the second ESS. The second ESS may provide grid services to the grid using some or all of its unused capacity.

Figure 15:
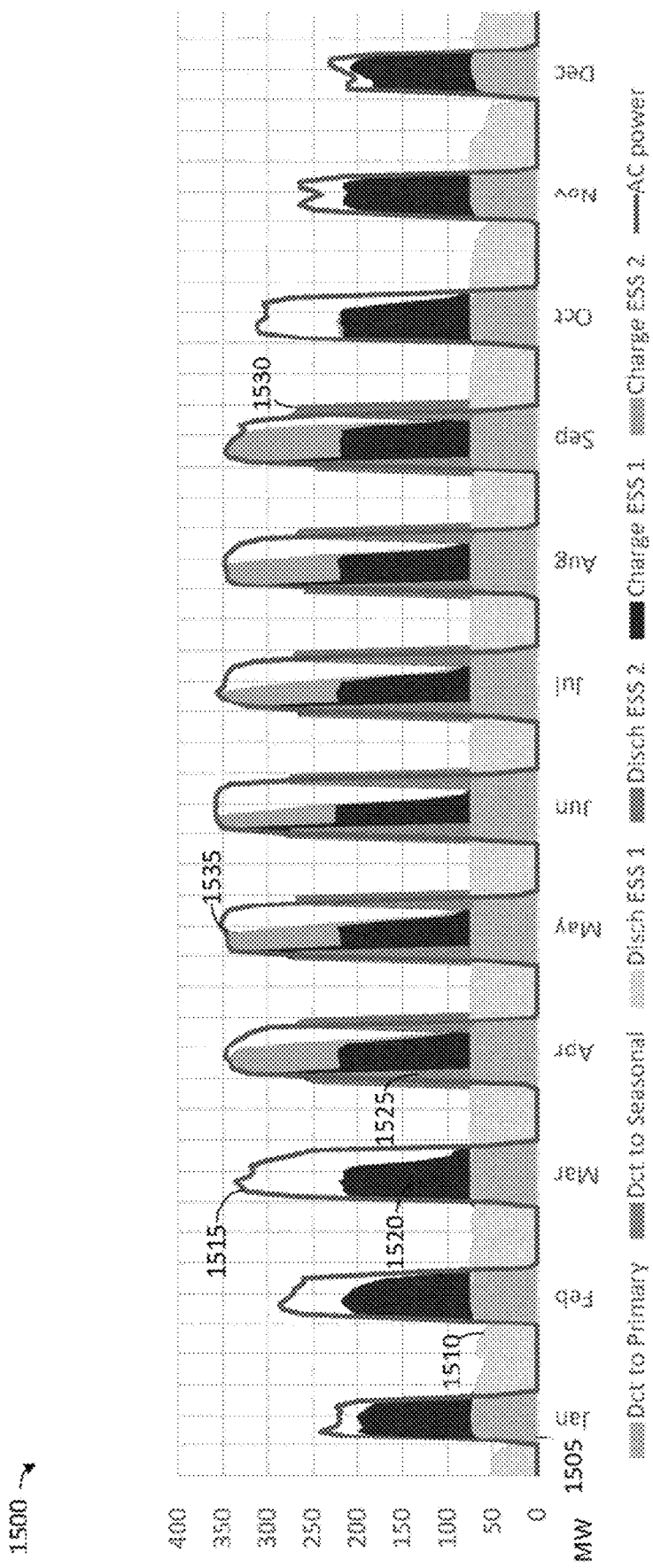
FIG. 15 illustrates an example power allocation of another example REPP.

FIG. 15 illustrates an example power allocation 1500 of an REPP. The REPP may be the REPP 100 of FIG. 1. The power allocation 1500 may show power for one year, where each month is represented by 24 hours, with each plotted quantity at an hour representing an average value of the quantity in the hour across all days of the month. For example, January includes a peak, where the peak represents power generated and allocated each hour of an average day in January. In this example, the RES is a solar resource, causing RES output to follow a peaked pattern corresponding to daytime sunlight. In an example, the power allocation 1500 is power allocated from a 540 MWdc/450 MWac RES to a 75 MW primary load at 97% capacity and a 200 MW secondary load.

The power allocation 1500 may include a primary load allocation 1505, a first ESS discharge 1510, total potential AC power 1515, a first ESS charge 1520, a secondary load allocation 1525, a second ESS discharge 1530, and a second ESS charge 1535. The total potential AC power 1515 may be a potential total RES output. The primary load allocation 1505 may be RES output delivered directly from the RES to a primary load. The secondary load allocation 1525 may be RES output delivered directly from the RES to a secondary load. The first ESS charge 1520 may be RES output allocated to charging a first ESS. The first ESS discharge 1510 may be power delivered by discharging the first ESS. The second ESS charge 1520 may be RES output allocated to charging a second ESS. The second ESS discharge 1530 may be power delivered by discharging the second ESS. In some embodiments, the first ESS discharge 1510 may be power delivered to the primary load and the second ESS discharge 1530 may be power delivered to the secondary load.

In some embodiments, the primary load allocation 1505 and the first ESS discharge 1510 provide power to the primary load. The primary load allocation 1505 and the first ESS discharge 1510 may provide a substantially constant amount of power to the primary load. The first ESS may time-shift RES output to provide the substantially constant amount of power to the primary load. For example, the primary load allocation 1505 and the first ESS discharge 1510 may provide 150 MW to the primary load year-round with an 85% capacity factor.

In some embodiments, the secondary load allocation 1525 and the second ESS discharge 1530 provide power to the secondary load. In April through September, the secondary load allocation 1525 and the second ESS discharge 1530 may provide a substantially constant amount of power to the secondary load for two set periods each day in the morning and the evening. For example, the secondary load allocation 1525 and the second ESS discharge 1530 may provide about 200 MW to the secondary load each morning and evening. The second ESS may time-shift RES output to provide the substantially constant amount of power to the secondary load for the set periods each day. In January, February, March, October, November, and December, the secondary load allocation 1525 and the second ESS discharge 1530 do not provide power to the secondary load, and no power is delivered to the secondary load. This difference in power delivery to the secondary load may be an example of the winter mode, as discussed herein. The secondary load may be seasonal, in that it receives power only in a certain season, such as summer.

The second ESS charge 1535 may be greater than zero in January, February, March, October, November, and December. The second ESS charge 1535 may be a trickle charge to maintain a charge of the second ESS for the second ESS to provide capacity.

Figure 16:
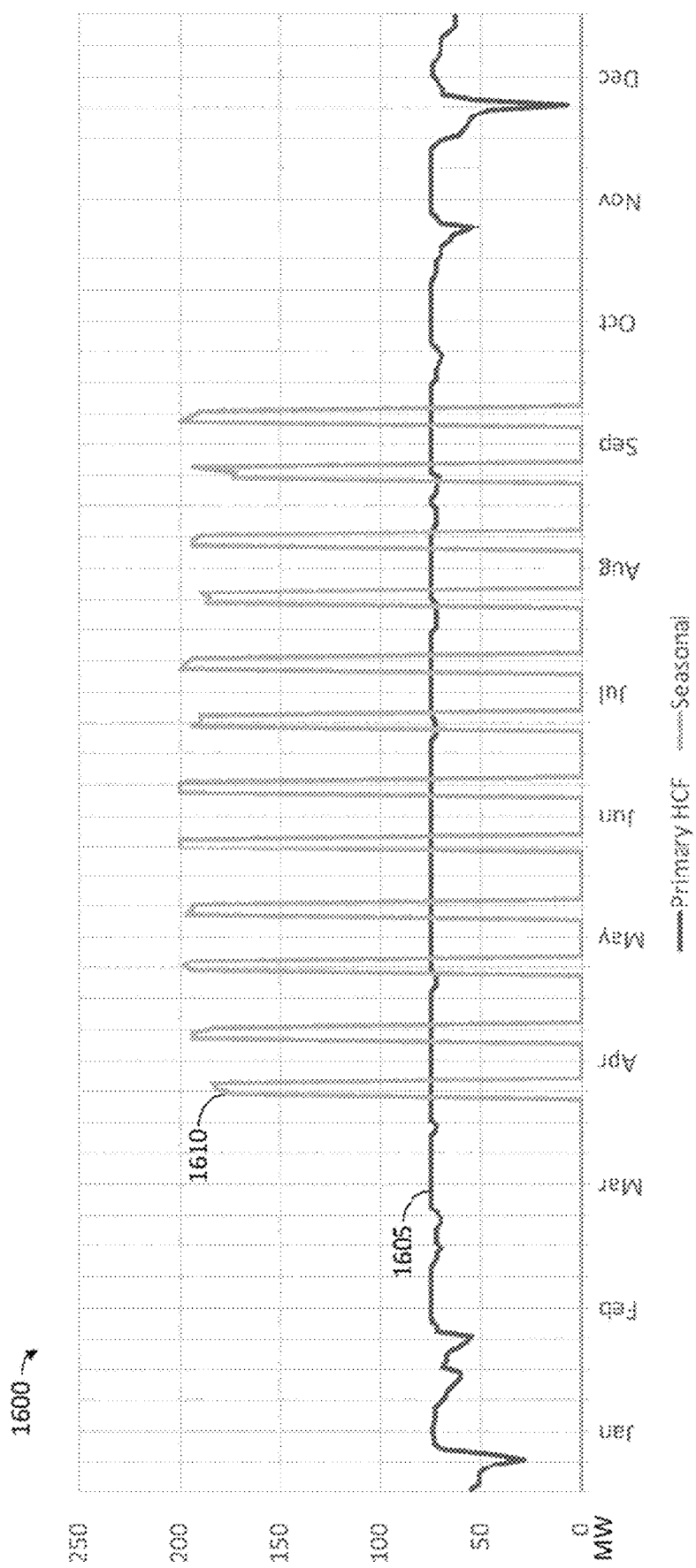
FIG. 16 illustrates an example power delivery of the REPP of FIG. 15.

FIG. 16 illustrates an example power delivery 1600 of the REPP of FIG. 15. Power delivery 1600 is shown with each month represented by 24 hours and each plotted quantity at an hour representing an average value of the quantity in the hour across all days of the month. The secondary load is provided power during morning and evening hours. In an example, the secondary load is provided power from 6:00 am to 8:00 am and from 5:00 pm to 7:00 pm. Thus, each month shows two peaks for a secondary load power 1610, one for daily morning hours and one for daily evening hours. A primary load power 1605 is substantially constant, with higher reliability in April, May, June, July, August, and September, and lower reliability in January, February, March, October, November, and December. The secondary load power 1610 is substantially constant in April, May, June, July, August, and September, and zero in January, February, March, October, November, and December. In some embodiments, power may be delivered to the second load during more, fewer, or different months.

Figure 17:
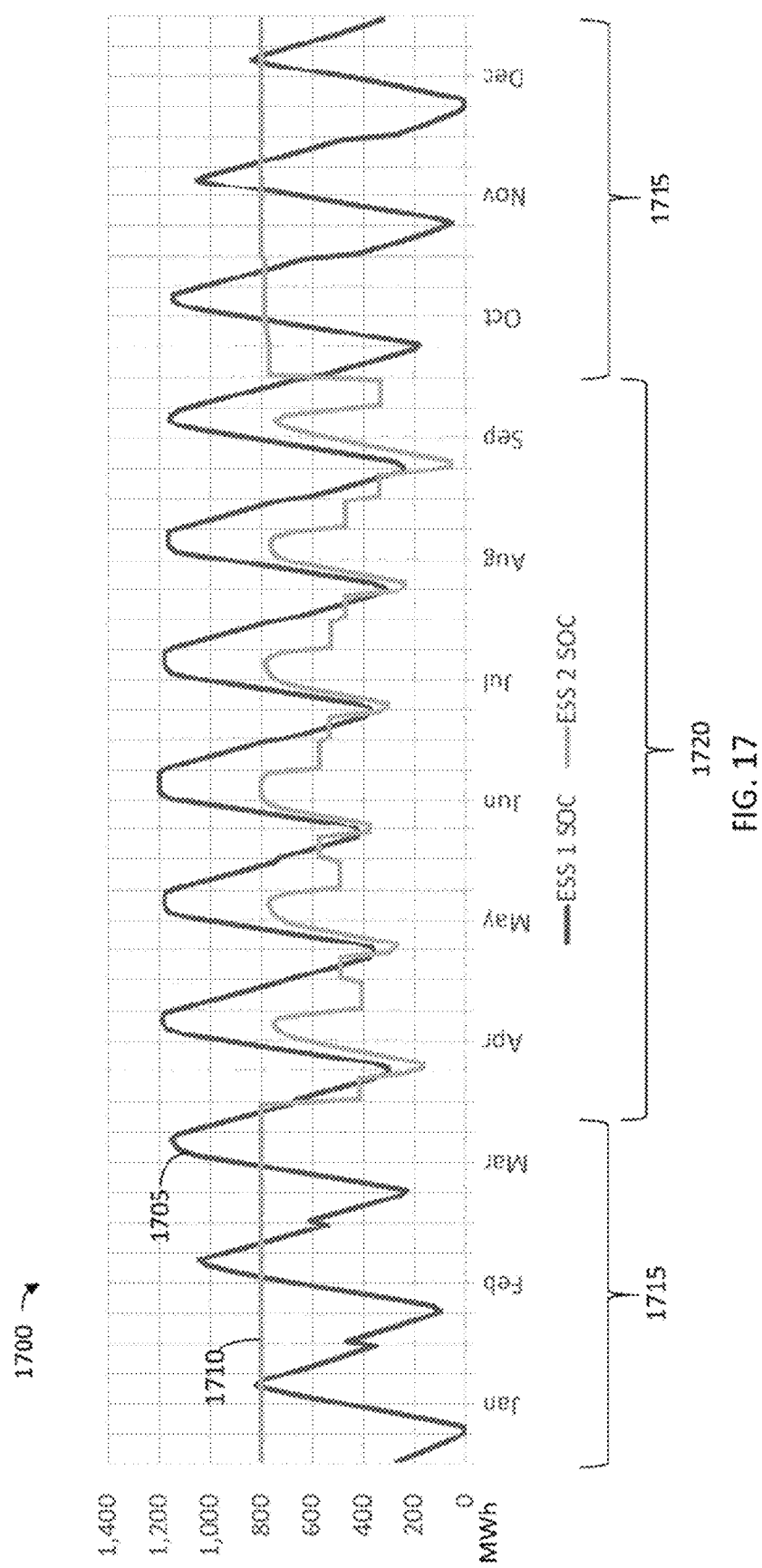
FIG. 17 illustrates example states of charge of the first ESS and the second ESS of FIG. 15.

FIG. 17 illustrates an example first ESS state of charge (SOC) 1705 and an example second ESS SOC 1710 of the first ESS and the second ESS, respectively, of FIG. 15. The first ESS SOC 1705 and second ESS SOC 1710 are shown in the same format as FIG. 15, with each month represented by 24 hours and each plotted quantity at an hour representing an average value of the quantity in the hour across all days of the month, and with a difference in the y-axis denoting MWh instead of MW. The first ESS SOC 1705 may cycle daily, rising as the first ESS is charged by the RES and falling as the first ESS is discharged. The first ESS SOC 1705 may be higher in April, May, June, July, August, and September than in January, February, March, October, November, and December. The first ESS SOC 1705 reflects the first ESS time-shifting RES output to provide substantially constant power to the first load. The first ESS SOC 1705 may equal zero, meaning the first ESS is fully discharged.

The second ESS SOC 1710 may include a capacity period 1715 and an energy period 1720. In some embodiments, the second ESS SOC 1710 may include multiple capacity periods and multiple energy periods 1720. The capacity period 1715 may cover October, November, December, January, February, and March. The energy period 1720 may cover April, May, June, July, August, and September. During the energy period 1720, the second ESS may provide energy and during the capacity period 1715, the second ESS may provide capacity. During the energy period, the second ESS SOC 1710 may cycle daily, rising as the second ESS is charged by the RES and falling as the second ESS is discharged. The second ESS SOC 1710 during the energy period 1720 represents the second ESS time-shifting RES output to provide power to the second load in morning and evening hours. The second ESS SOC 1710 declines sharply in morning hours and again in evening hours, resulting in two peaks per day.

In the capacity period 1715, on most days no energy is delivered to the secondary load and the second ESS SOC 1710 remains constant. In some embodiments, the second ESS SOC 1710 remains constant at a full storage capacity of the second ESS. The second ESS may provide capacity to the grid by maintaining the second ESS SOC 1710 available for use. The second ESS may provide spinning reserve to the grid. In other embodiments, the second ESS SOC 1710 may be maintained at a level lower than the full storage capacity of the second ESS. The second ESS may provide grid services to the grid using some or all of its unused capacity.

Aspects of the present disclosure are directed to a renewable energy power plant (REPP) including a renewable energy source (RES), a first meter associated with a first load, a second meter associated with a second load, a first ESS electrically coupled to the RES and the first meter, a second ESS electrically coupled to the RES and the first meter through a switch, and a controller configured to set a first charge/discharge for the first ESS and a second charge/discharge for the second ESS such that the REPP delivers power to the first load longer than the RES produces power, in response to a trigger condition, actuate the switch such that the second ESS is electrically coupled to the second meter, setting a third charge/discharge for the first ESS such that the REPP delivers power to the first load longer than the RES produces power, and set a fourth charge/discharge for the second ESS such that the second ESS maintains a portion of its charge in reserve for the second load.

Aspects of the present disclosure are directed to an REPP including a renewable energy source (RES), a first meter associated with a first load, a second meter associated with a second load, a first ESS electrically coupled to the RES and the first meter, a second ESS electrically coupled to the RES and a third load through a switch, and a controller configured to set a first charge/discharge for the first ESS such that the REPP delivers power to the first load longer than the RES produces power, in response to a trigger condition, actuate the switch such that the second ESS is electrically coupled to the second meter, and set a third charge/discharge for the second ESS such that the second ESS maintains a portion of its charge in reserve for the second load.

Aspects of the present disclosure are directed to a method including setting, by a controller of an renewable power plant (REPP), a first charge/discharge for a first REPP electrical storage system (ESS) and a second charge/discharge for a second REPP ESS such that the REPP delivers power to a first load longer than an REPP renewable energy source (RES) of the REPP produces power, wherein the first ESS is electrically coupled to the RES and to a first meter, and wherein the second ESS is electrically coupled to the RES and to the first meter through a switch, in response to a trigger condition, actuating the switch such that the second ESS is electrically coupled to the second meter, setting a third charge/discharge for the first ESS such that the REPP delivers power to the first load longer than the RES produces power, and setting a fourth charge/discharge for the second ESS such that the second ESS maintains a portion of its charge in reserve for the second load.

In some embodiments, the trigger condition includes a termination of a time period. In some embodiments, the time period includes a season. In some embodiments, the trigger condition includes an RES power output falling below a predefined threshold. In some embodiments, the predefined threshold is based on power delivery requirements of the first load.

In some embodiments, the RES is tuned such that the RES power output is high enough to satisfy the power delivery requirements of the first load and maintain the portion of charge of the second ESS.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "similar," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of power allocation from a renewable energy power plant (REPP) having a renewable energy source (RES) and a first energy storage system (ESS) and a second ESS, the method comprising:
   in a first mode of operation, delivering power to a first load from the RES, the first ESS and the second ESS to satisfy power requirements of the first load for a first time longer than a first production time when the RES produces power;
   in a second mode of operation, delivering power to the first load from the RES and first ESS to satisfy power requirements of the first load for a second time longer than a second production time when the RES produces power and maintaining a portion of charge at the second ESS in reserve for the second load; and
   switching from the first mode of operation to the second mode of operation upon either a) energy output of the RES during a predetermined time period falling below a first threshold or b) production time when the RES produces power falling below a second threshold,
   wherein the first ESS and the second ESS are portions of one physical ESS and a first portion of the one physical ESS is allocated to the first ESS changes depending on a season.

2. The method of claim 1, wherein a second portion of the one physical ESS allocated to the second ESS is larger during a winter season.

3. The method of claim 1, wherein the first load and the second load are a same physical load, and the first load is the physical load under a first condition and the second load is the physical load under a different condition.

4. The method of claim 1, wherein the first threshold and the second threshold are the same.

5. The method of claim 1, wherein the second ESS is configured to provide reserve power to satisfy power requirements of the first load.

6. A power allocation system comprising:
   a renewable energy power plant (REPP) having a renewable energy source (RES) and a first energy storage system (ESS) and a second ESS; and
   a controller having programmed instructions that, when executed, cause the controller to perform a process comprising:
   in a first mode of operation, deliver power to a first load from the RES, the first ESS and the second ESS to satisfy power requirements of the first load for a first time longer than a first production time when the RES produces power;
   in a second mode of operation, deliver power to the first load from the RES and first ESS to satisfy power requirements of the first load for a second time longer than a second production time when the RES produces power and maintain a portion of charge at the second ESS in reserve for the second load; and
   switch from the first mode of operation to the second mode of operation upon either a) energy output of the RES during a predetermined time period falling below a first threshold or b) production time when the RES produces power falling below a second threshold,
   wherein the first ESS and the second ESS are portions of one physical ESS and a first portion of the one physical ESS is allocated to the first ESS changes depending on a season.

7. The system of claim 6, wherein a second portion of the one physical ESS allocated to the second ESS is larger during a winter season that the second portion during a non-winter season.

8. The system of claim 6, wherein the first load and the second load are a same physical load and the first load is the physical load under a first condition and the second load is the physical load under a different condition.

9. The system of claim 6, wherein the first threshold and the second threshold are the same.

10. The system of claim 6, wherein the second ESS is configured to provide reserve power to satisfy power requirements of the first load.

11. A non-transitory computer-readable media comprising computer-executable instructions embodied thereon that, when executed by a processor, cause the processor to perform a process comprising:
    in a first mode of operation, delivering power to a first load from the RES, the first ESS and the second ESS to satisfy power requirements of the first load for a first time longer than a first production time when the RES produces power;
    in a second mode of operation, delivering power to the first load from the RES and first ESS to satisfy power requirements of the first load for a second time longer than a second production time when the RES produces power and maintaining a portion of charge at the second ESS in reserve for the second load; and
    switching from the first mode of operation to the second mode of operation upon either a) energy output of the RES during a predetermined time period falling below a first threshold or b) production time when the RES produces power falling below a second threshold,
    wherein the first ESS and the second ESS are portions of one physical ESS and a first portion of the one physical ESS is allocated to the first ESS changes depending on a season.

12. The non-transitory computer-readable media of claim 11, wherein the first ESS and the second ESS are portions of one physical ESS.

13. The non-transitory computer-readable media of claim 12, wherein a first portion of the one physical ESS allocated to the first ESS changes depending on a season.

14. The non-transitory computer-readable media of claim 13, wherein a second portion of the one physical ESS allocated to the second ESS is larger during a winter season that the second portion during a non-winter season.

15. The non-transitory computer-readable media of claim 11, wherein the first load and the second load are a same physical load and the first load is the physical load under a first condition and the second load is the physical load under a different condition.

16. The non-transitory computer-readable media of claim 11, wherein the second ESS is configured to provide reserve power to satisfy power requirements of the first load.

\* \* \* \* \*